United States Patent
Matsumoto et al.

(10) Patent No.: US 7,223,301 B2
(45) Date of Patent: May 29, 2007

(54) ANTHRAPYRIDONE COMPOUND, WATER-BASED MAGENTA INK COMPOSITION AND INKJET RECORDING METHOD

(75) Inventors: Hiroyuki Matsumoto, Saitama (JP); Katsunori Fujii, Kawaguchi (JP); Yasuo Shirasaki, Saitama (JP); Takafumi Fujii, Saitama (JP); Yasuo Murakami, Kawaguchi (JP); Noriko Kajiura, Katsushika-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/557,128

(22) PCT Filed: May 20, 2004

(86) PCT No.: PCT/JP2004/006819

§ 371 (c)(1),
(2), (4) Date: Nov. 17, 2005

(87) PCT Pub. No.: WO2004/104107

PCT Pub. Date: Dec. 2, 2004

(65) Prior Publication Data

US 2006/0219131 A1 Oct. 5, 2006

(30) Foreign Application Priority Data

May 22, 2003 (JP) ............................ 2003-144768
Apr. 28, 2004 (JP) ............................ 2004-132868

(51) Int. Cl.
C09D 11/00 (2006.01)
C09D 11/02 (2006.01)
C07D 221/18 (2006.01)
B41J 2/01 (2006.01)

(52) U.S. Cl. ...................... 106/31.47; 546/76; 347/100
(58) Field of Classification Search ............. 106/31.47, 106/31.77; 546/76; 347/100
See application file for complete search history.

(56) References Cited

U.S. PATENT DOCUMENTS 2,962,497 A * 11/1960 Guenthard ................. 544/188
6,152,969 A * 11/2000 Matsumoto et al. ............ 8/658
6,471,760 B1 * 10/2002 Matsumoto et al. ..... 106/31.47
6,645,283 B1 * 11/2003 Matsumoto et al. ..... 106/31.47
6,843,839 B2 * 1/2005 Kanke et al. ............. 106/31.47
6,852,154 B2   2/2005 Kitamura et al. ........ 106/31.47
6,929,361 B2 * 8/2005 Matsumoto et al. ........ 347/100
6,984,032 B2 * 1/2006 Kitamura et al. ........... 347/100
2006/0139428 A1 * 6/2006 Osumi et al. ................ 347/100

FOREIGN PATENT DOCUMENTS

| JP | 2004-2814 | 1/2004 |
|---|---|---|
| JP | 2004-091632 | 3/2004 |
| WO | 99/48981 | 9/1999 |
| WO | 03/027185 | 4/2003 |

OTHER PUBLICATIONS

The International Search Report dated Jun. 22, 2004.

* cited by examiner

Primary Examiner—Helene Klemanski
(74) Attorney, Agent, or Firm—Nields & Lemack

(57) ABSTRACT

The present invention provides magenta dyestuff represented by the formula (1):

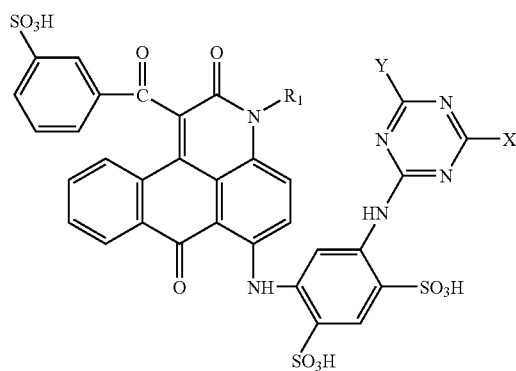

(symbols are as defined in the present description), with hue and vividness suitable to ink-jet recording, excellent fastness to light, gas, water and so on in records and an ink composition using said dyestuff.

20 Claims, No Drawings

ANTHRAPYRIDONE COMPOUND, WATER-BASED MAGENTA INK COMPOSITION AND INKJET RECORDING METHOD

TECHNICAL FIELD

The present invention relates to a new anthrapyridone compound, a water-based magenta ink composition and a method of ink-jet recording.

BACKGROUND ART

Diverse ink jetting processes have been developed for the recording method by means of an ink-jet printer, and any process comprises generating ink droplets to deposit onto various recording materials (such as paper, film, cloth) for recording. The recording method by means of ink-jet printer has rapidly been spread in recent years and will be propagated in future because the method brings about no mechanical noise due to the system in which a recording head does not contact with the recording material and because the method advantageously allows the printer to become downsized, to work in a high-speed and to give color printing, easily. For recording an image information or a character information pictured on a computer color display in color by means of an ink-jet printer, the information is generally printed according to subtractive color mixing of inks of four colors, namely yellow(Y), magenta(M), cyan(C) and black (K). In order to print reproducibly an image pictured by additive color mixing of red (R), green (G) and blue (B) on a CRT display as faithfully as possible according to subtractive color mixing, the dyestuffs to use, especially ones for a Y, M or C ink, are desired to have color hues close to the respective standards of Y, M and C and vividness. Additionally, it is required that the resulting ink composition is stable for long-term storage and that the resulting printed image is of a high optical density and has excellent fastness including water fastness, light fastness, gas fastness and so on.

Ink-jet printers are increasingly used in a wide range from a small one for OA use to a big one for industrial use. So, excellence in fastness such as water fastness and light fastness of the printed image is more strictly demanded. The water fastness is substantially improved by coating inorganic micro particles such as porous silica, a cationic polymer, alumina sol or special ceramics which can absorb dyestuff from ink, on a paper sheet together with PVA resin. Further improvement in quality such as moisture fastness is desired in order to store the printed matter such as photos in good condition. However, light fastness is not yet improved by any established technique. Among tetrachromatic colors of Y, M, C and K, magenta especially has many dyestuffs which are naturally weak in light fastness, and the improvement is an important problem to be solved.

The typical types in chemical structure of magenta dyestuffs used in a water-soluble ink for ink-jet recording are a xanthene type and an azo type using the H acid. The xanthene type is indeed excellent in hue and vividness, but is very inferior in light fastness. The azo type using the H acid is good in hue and water fastness, but is inferior in light fastness and vividness. Some magenta dyestuffs in this type being excellent in vividness and light fastness have been developed, but are still inferior in light fastness to dyestuffs of the other hue such as yellow dyestuffs and cyan dyestuffs represented by copper phthalocyanine type.

Recently, the digital camera having been in widespread use, the chance to print out photos at home is increasing. However, there is a problem of color change in photos during storage by the oxidizing gas in the air.

Alternatively, for a chemical structure of magenta dyes being excellent in vividness and light fastness, an anthrapyridone type is known (for example, refer to patent literatures 1 to 8), but can not yet show any satisfactory properties in hue, vividness, light fastness, water fastness, gas fastness and dissolving stability.

Patent literature 1: JP Laid-Open No. 74173/1984 (1 to 3 pages),
Patent literature 2: JP Laid-Open No. 16171/1990 (1 and 5 to 7 pages),
Patent literature 3: JP Laid-Open No. 109464/2000 (1 to 2 and 8 to 12 pages),
Patent literature 4: JP Laid-Open No. 169776/2000 (1 to 2 and 6 to 9 pages),
Patent literature 5: JP Laid-Open No. 191660/2000 (1 to 3 and 11 to 14 pages),
Patent literature 6: JP Laid-Open No. 72884/2001 (1 to 2 and 8 to 11 pages),
Patent literature 7: JP Laid-Open No. 139836/2001 (1 to 2 and 7 to 12 pages)
Patent literature 8: JP Laid-Open No. 192930/2003 (1 to 4 and 11 pages)

DISCLOSURE OF THE INVENTION

THE PROBLEMS TO BE RESOLVED BY THE INVENTION

An object of the present invention is to provide magenta dyestuff which has hue and vividness suitable for ink-jet recording and gives the recorded article with high fastness in light fastness, gas fastness and moisture fastness; and magenta dyestuff suitable therefor.

MEANS TO SOLVE THE PROBLEMS

The present inventors made a diligent study to solve the above problem and, as a result, have completed the present invention. Namely, the present invention relates to the following aspects:

1. An anthrapyridone compound represented by the following formula (1):

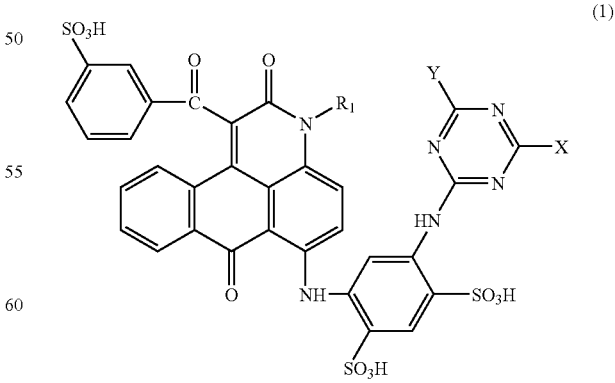

(wherein $R_1$ represents a hydrogen atom, an alkyl group, a hydroxy lower alkyl group, a cyclohexyl group, mono- or dialkylaminoalkyl group or a cyano lower alkyl group;

X represents an anilino group which may be substituted with a sulfonic acid group, a methoxy group, an anilino group and a phenoxy group, methyl-sulfoanilino group, a methoxy-sulfoanilino group, a carboxy-sulfoanilino group, a carboxy-hydroxyanilino group, a naphthylamino group which may be substituted with a sulfonic acid group, mono- or dialkylamino group which may be substituted with a sulfonic acid group, a carboxyl group and a hydroxyl group, an aralkylamino group, a cycloalkylamino group, a phenoxy group which may be substituted with a sulfonic acid group, a carboxyl group, an acetylamino group, an amino group, a hydroxyl group, a phenoxy group, or a phenyl group, a monoalkylaminoalkylamino group, a dialkylaminoalkylamino group; a hydroxyl group or an amino group; and Y represents a chlorine atom, a hydroxyl group, an amino group, mono- or dialkylamino group (which may have a substituent selected from the group consisting of a sulfonic acid group, a carboxyl group and a hydroxyl group on an alkyl group), or a morpholino group), or the salt thereof.

2. The anthrapyridone compound or the salt thereof according to the above aspect 1, wherein $R_1$ in the above formula (1) is a methyl group.
3. The anthrapyridone compound or the salt thereof according to the above aspect 1 or 2, wherein Y in the above formula (1) is a hydroxyl group or an amino group.
4. The anthrapyridone compound or the salt thereof according to any one of the above aspects 1 to 3, wherein X in the above formula (1) is an anilino group, a 2-sulfoanilino group, a 2,5-disulfoanilino group, a 2-ethylhexylamino group or a cyclohexylamino group, a 4-methoxy-2-sulfoanilino group, a 2-carboxy-5-sulfoanilino group and a 3-carboxy-4-hydroxyanilino group.
5. An anthrapyridone compound represented by the following formula (1'):

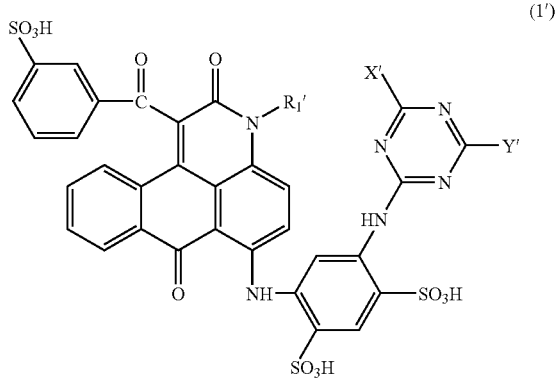

(wherein $R_1'$ represents a hydrogen atom, an alkyl group, a hydroxyalkyl group, a cyclohexyl group, mono- or dialkylaminoalkyl group or a cyano alkyl group;

X' represents an aniline group (which may be substituted with a carboxyl group, a sulfonic acid group, an alkyl group, an alkoxyl group, an anilino group or a phenoxy group); a naphthylamino group which may be substituted with a methyl-sulfoanilino group, a carboxy-sulfoanilino group and a sulfonic acid group, an aralkylamino group, a cycloalkylamino group or a phenoxy group (which may be substituted with a sulfonic acid group, a carboxyl group, an acetylamino group, an amino group, a hydroxyl group, a phenoxy group or a phenyl group); and Y' represents an alkylthio group (which may have a substituent selected from the group consisting of a sulfonic acid group, a carboxyl group and a hydroxyl group on an alkyl group), a phenylthio group (which may be substituted with a carboxyl group, a sulfonic acid group, a hydroxyl group, an alkyl group or an alkoxyl group) or an anilino group (which may be substituted with a carboxyl group, a sulfonic acid group, an alkyl group, an alkoxyl group, an anilino group or a phenoxy group, on a phenyl group)), or the salt thereof.

6. The anthrapyridone compound or the salt thereof according to claim 1, wherein $R_1'$ in the formula (1') is a methyl group.
7. The anthrapyridone compound or the salt thereof according to the above aspect 1 or 2, wherein $Y_1'$ in the formula (1') is an anilino group, a 2-carboxyanilino group or a 3-sulfopropylthio group.
8. The anthrapyridone compound or the salt thereof according to any one of the above aspects 1 to 3, wherein $X_1'$ in the formula (1') is an anilino group, a 2,6-dimethylanilino group, a 2,4,6-trimethylanilino group, a 2,6-diethylanilino group, a 2-carboxyanilino group, a 2-sulfoanilino group, a 2,5-disulfoanilino group, a benzylamino group or a cyclohexylamino group.
9. A water-based magenta ink composition characterized by comprising the anthrapyridone compound or the salt thereof according to any one of the above aspects 1 to 8 as a dyestuff component.
10. The water-based magenta ink composition according to the above aspect 9, wherein the composition contains a water-soluble organic solvent.
11. The water-based magenta ink composition according to the above aspect 9, wherein the content of an inorganic salt in the anthrapyridone compound or the salt thereof is 1% by mass or less.
12. The water-based magenta ink composition according to the above aspect 11, wherein the composition contains a water-soluble organic solvent.
13. The water-based magenta ink composition according to the above aspect 9, which is prepared for ink-jet recording.
14. The water-based magenta ink composition according to the above aspect 12, which is prepared for ink-jet recording.
15. A method for ink-jet recording, wherein ink droplets are ejected responding to the record signals to record onto a recording material, characterized by using the water-based magenta ink composition according to the above aspect 9 as an ink.
16. A method for ink-jet recording, wherein ink droplets are ejected responding to the record signals to record onto a recording material, characterized by using the water-based magenta ink composition according to the above aspect 12 as an ink.
17. The method for ink-jet recording according to the above aspects 15 or 17, wherein the recording material is an information transmission sheet.
18. A container containing the water-based magenta ink composition according to the above aspect 9.
19. An ink-jet printer having the container according to the above aspect 19.
20. A colored article comprising the anthrapyridone compound or the salt thereof according to any one of the above aspects 1 to 8.

EFFECTS OF THE PRESENT INVENTION

The new anthrapyridone compound of the present invention is excellent in water-solubility, stable in storing an aqueous solution thereof and characterized by having good separable property by filtration through a membrane filter in the production process of an ink composition. The compound is highly safe for a living body. Furthermore, the ink composition of the present invention using the new anthrapyridone compound does not show crystal deposition, changes in property and color after a long period of storage, so that it has good storage stability. The ink composition of the present invention, when used as a magenta ink for ink-jet recording, can provide a printed matter with excellent grade in light fastness, ozone gas fastness and moisture fastness. Therefore, excellent ink-jet recording is possible. The composition also can provide a vivid printed surface as well as an ideal magenta color. The composition, when used together with a yellow or cyan ink, can provide a wide visible ray range of color tone. Therefore, the ink composition of the present invention is extremely useful as a magenta ink for ink-jet recording.

BEST MODE FOR CARRYING OUT THE INVENTION

The present invention is explained in more detail. The anthrapyridone compound or the salt thereof of the present invention is represented by the above formula (1) or the formula (1').

In formula (1), $R_1$ represents a hydrogen atom, an alkyl group, a hydroxy lower alkyl group, a cyclohexyl group, mono- or dialkylaminoalkyl group or a cyano lower alkyl group.

As the alkyl group in the present invention includes, for example, a $C_{1-8}$ alkyl group such as a methyl group, an ethyl group, a n-propyl group, an iso-propyl group, a n-butyl group, a tert-butyl group, a n-hexyl group and a n-octyl group.

As the lower alkyl group in the present invention, such one as having 1 to 6 carbon atoms, preferably 1 to 4 carbon atoms, among the above-described alkyl groups is included and more preferably, a methyl group, an ethyl group or a propyl group is included. This is similarly applied to the term "lower" in the phrase, such as lower alcohols, other than a lower alkyl group in the present invention.

As the hydroxy lower alkyl group in $R_1$, for example, a hydroxyethyl group, a hydroxypropyl group and the like are included, and as the monoalkylaminoalkyl group, for example, a methylaminopropyl group, an ethylaminopropyl group and the like are included, and as the dialkylaminoalkyl group, for example, a dimethylaminopropyl group, a diethylaminoethyl group, and the like are included, and as the cyano lower alkyl group, for example, an cyanoethyl group, a cyanopropyl group, and the like are included. A preferable $R_1$ includes a hydrogen atom, a lower alkyl group and the like, and a hydrogen atom and a methyl group are more preferable, and a methyl group is particularly preferable.

A typical example of an anilino group in X of the formula (1) which may be substituted with a sulfonic acid group, a carboxyl group, a methyl group, a methoxy group, an anilino group or a phenoxy group includes, for example, an anilino group, a 2-sulfoanilino group, a 3-sulfoanilino group, a 4-sulfoanilino group, a 2,5-disulfoanilino group, a 4-methoxy-2-sulfoanilino group, a 4-methyl-2-sulfoanilino group, a 2-methyl-4-sulfoanilino group, a 2-carboxy-5-sulfoanilino group, a 2-carboxy-4-sulfoanilino group, a 4-anilino-3-sulfoanilino group, a 4-methoxy-2-sulfoanilino group, a 2-carboxy-5-sulfoanilino group, a 3-carboxy-4-hydroxyanilino group, a 4-phenoxyanilino group, and the like, and a typical example of a naphthylamino group which may be substituted with a sulfonic acid group includes, for example, a 1-naphthylamino group, a 4-sulfo-1-naphthylamino group, a 5-sulfo-1-naphthylamino group, a 5-sulfo-2-naphthylamino group, a 6-sulfo-1-naphthylamino group, a 7-sulfo-1-naphthylamino group, a 4,8-disulfo-2-naphthylamino group, a 3,8-disulfo-1-naphthylamino group, a 3,6-disulfo-1-naphthylamino group, a 3,6,8-trisulfo-2-naphthylamino group, a 4,6,8-trisulfo-2-naphthylamino group, a 3,6,8-trisulfo-1-naphthylamino group, and the like, and a typical example of a monoalkylamino group which may be substituted with a sulfonic acid group, a carboxylic group or a hydroxyl group includes, for example, a methylamino group, an ethylamino group, a propylamino group, a butylamino group, a 2-ethylhexylamino group, a 2-sulfoethylamino group, a 2-carboxyethylamino group, a 1,2-dicarboxyethylamino group, a 1,3-dicarboxypropylamino group, a 2-hydroxyethylamino group, a cyclohexylamino group, and the like, and a typical example of a dialkylamino group which may be substituted with a sulfonic acid group, a carboxylic group or a hydroxyl group includes, for example, a dimethylamino group, a diethylamino group, a dipropylamino group, a dibutylamino group, a bis(carboxymethyl)amino group, a bis(2-hydroxyethyl)amino group, and the like, and a typical example of an aralkylamino group includes, for example, a benzylamino group, and a typical example of a cycloalkylamino group includes, for example, a cyclohexylamino group, and a typical example of a phenoxy group, which may be substituted with a sulfonic acid group, a carboxylic group, an acetylamino group, an amino group, a hydroxyl group, a phenoxy group or a phenyl group includes, for example, a phenoxy group, a 4-sulfophenoxy group, a 4-carboxyphenoxy group, a 4-acetylaminophenoxy group, a 4-hydroxyphenoxy group, a 4-phenoxyphenoxy group, a 4-(4-carboxyphenoxy)phenoxy group, a 4-phenylphenoxy group, and the like, and a typical example of a monoalkylaminoalkylamino group includes, for example, a 2-methylamino-ethylamino group, a 3-methylamino-propylamino group, a 3-ethylamino-propylamino group, and the like, and a typical example of a dialkylaminoalkylamino group includes, for example, a 3-(N,N-diethylamino)propylamino group, a 2-(N,N-diethylamino)ethylamino group, and the like. X is preferably a 2-sulfoanilino group, a 2,5-disulfoanilino group, a 4-methyl-2-sulfoanilino group, a 2-methyl-4-sulfoanilino group, a 4-methoxy-2-sulfoanilino group, a 2-carboxy-5-sulfoanilino group and a 2-carboxy-4-sulfoanilino group, particularly preferable a 2-sulfoanilino group, a 2,5-disulfoanilino group, a 2-carboxy-5-sulfoanilino group and a 2-carboxy-4-sulfoanilino group.

As Y in the formula (1), a chlorine atom, a hydroxyl group, an amino group, a 2-sulfoethylamino group, a 2-carboxyethylamino group, a carboxymethylamino group, a 1,2-dicarboxyethylamino group, a 1,3-dicarboxypropylamino group, a 2-hydroxyethylamino group, a 3-(N,N-diethylamino)propylamino group, a 2-(N,N-diethylamino)ethylamino group, a bis(carboxymethyl) amino group, a morpholino group and the like can be included, and a hydroxyl group, an amino group, a 2-sulfoethylamino group, a 2-carboxyethylamino group, a carboxymethylamino group, a 3-(N,N-diethylamino)propylamino group, a 2-(N,N-diethylamino)ethylamino group and a bis(carboxymethyl) amino group are preferable, and a hydroxyl group and an amino group are particularly preferable.

As a preferable combination of $R_1$, X and Y, for example, $R_1$ is a hydrogen atom or a methyl group; X is an anilino group, a 2-sulfoanilino group, a 2,5-disulfoanilino group, a 4-methoxy-2-sulfoanilino group, a 2-carboxy-5-sulfoanilino group, a 3-carboxy-4-hydroxyanilino group, a 2-ethylhexylamino group or a cyclohexylamino group; and Y is a hydroxyl group or an amino group.

Typical examples of the anthrapyridone compounds represented by the above formula (1) of the present invention are listed in Table 1. In Table 1, (S) and 2(S) mean a sulfonic acid group and a disulfonic acid group, respectively, and (K) means a carboxyl group.

TABLE 1

| No. | $R_1$ | X | Y |
|---|---|---|---|
| 1-1 | CH3 | 2,5-2(S)-anilino | OH |
| 1-2 | CH3 | 2,5-2(S)-anilino | NH2 |
| 1-3 | CH3 | 2,5-2(S)-anilino | monoethanolamino |
| 1-4 | CH3 | 2,5-2(S)-anilino | diethanolamino |
| 1-5 | CH3 | anilino | OH |
| 1-7 | CH3 | anilino | carboxyethylamino |
| 1-8 | H | anilino | sulfoethylamino |
| 1-9 | CH3 | benzylamino | OH |
| 1-10 | CH3 | cyclohexylamino | OH |
| 1-11 | CH3 | cyclohexylamino | cyclohexylamino |
| 1-12 | CH3 | n-butylamino | OH |
| 1-13 | CH3 | N,N-diethylpropylamino | OH |
| 1-14 | CH3 | N,N-diethylpropylamino | N,N-diethylpropylamino |
| 1-16 | CH3 | anilino | N,N-diethylpropylamino |
| 1-17 | CH3 | 4-phenylphenoxy | OH |
| 1-18 | CH3 | 4-phenylphenoxy | NH2 |
| 1-19 | CH3 | 3-aminoanilino | OH |
| 1-20 | CH3 | anilino | NH2 |
| 1-21 | CH3 | NH2 | NH2 |
| 1-22 | CH3 | 2-ethylhexylamino | OH |
| 1-23 | CH3 | 2-ethylhexylamino | NH2 |
| 1-24 | CH3 | 2-ethylhexylamino | 2-ethylhexylamino |
| 1-25 | CH3 | 2-ethylhexylamino | morpholino |
| 1-26 | CH3 | 2-ethylhexylamino | Cl |
| 1-27 | CH3 | 3-(S)-anilino | OH |
| 1-28 | CH3 | 3-(S)-anilino | NH2 |
| 1-29 | CH3 | 3-(S)-anilino | monoethanolamino |
| 1-30 | C2H5 | 3-(S)-anilino | carboxyethylamino |
| 1-31 | CH3 | 3-(S)-anilino | sulfoethylamino |
| 1-32 | CH3 | 2-(S)-anilino | OH |
| 1-33 | CH3 | 2-(S)-anilino | NH2 |
| 1-34 | C2H4OH | 2-(S)-anilino | 2-ethylhexylamino |
| 1-35 | CH3 | 2-(S)-anilino | morpholino |
| 1-36 | CH3 | 4-methoxy-2-(S)-anilino | OH |
| 1-37 | C4H9 | 4-methoxy-2-(S)-anilino | NH2 |
| 1-38 | CH3 | 2-(K)-5-(S)-anilino | OH |
| 1-39 | CH3 | 2-(K)-4-(S)-anilino | OH |
| 1-40 | CH3 | 4-(S)-naphthyl-1-ylamino | OH |

In formula (1'), $R_1'$ represents a hydrogen atom, an alkyl group, a hydroxy lower alkyl group, a cyclohexyl group, mono- or dialkylaminoalkyl group or a cyano lower alkyl group. As the alkyl group in the present invention, for example, a $C_{1-8}$ alkyl group such as a methyl group, an ethyl group, a n-propyl group, an iso-propyl group, a n-butyl group, a tert-butyl group, a n-hexyl group and a n-octyl group are included.

As the hydroxy lower alkyl group in $R_1'$, for example, a hydroxyethyl group, a hydroxypropyl group and the like are included, and as the monoalkylaminoalkyl group, for example, a methylaminopropyl group, an ethylaminopropyl group and the like are included, and the dialkylaminoalkyl group, for example, a dimethylaminopropyl group, a diethylaminoethyl group, and the like are included, and as the cyano lower alkyl group, for example, an cyanoethyl group, a cyanopropyl group, and the like are included. As a preferable $R_1'$, a hydrogen atom and a lower alkyl group are included, and a hydrogen atom and a methyl group are more preferable, and a methyl group is particularly preferable.

The anilino group in X' of the formula (1') may be substituted with a carboxyl group, a sulfonic acid group, an alkyl group, an alkoxyl group, an anilino group or a phenoxy group. As the alkyl group and the alkoxyl group, one having 1 to 8 carbon atoms is preferable. A typical example of these includes, for example, an anilino group, a 2-metylanilino group, a 2,6-dimethylanilino group, a 2,5-dimethylanilino group, a 2,6-diethylanilino group, a 2,5-diethylanilino group, a 2,6-diisopropylanilino group, a 2,5-diisopropylanilino group, a 2,4,6-trimethylanilino group, a carboxyanilino group, a 2-sulfoanilino group, a 3-sulfoanilino group, a 4-sulfoanilino group, a 2,5-disulfoanilino group, a 4-methoxy-2-sulfoanilino group, a 4-methyl-2-sulfoanilino group, a 2-methyl-4-sulfoanilino group, a 2-carboxy-5-sulfoanilino group, a 2-carboxy-4-sulfoanilino group, a 4-anilino-3-sulfoanilino group, a 4-phenoxyanilino group, and the like.

A typical example of a naphthylamino group, which may be substituted with a sulfonic acid group includes, for example, a 1-naphthylamino group, a 4-sulfo-1-naphthylamino group, a 5-sulfo-1-naphthylamino group, a 5-sulfo-2-naphthylaminogroup, a 6-sulfo-1-naphthylamino group, a 7-sulfo-1-naphthylamino group, a 4,8-disulfo-2-naphthylamino group, a 3,8-disulfo-2-naphthylamino group, a 3,6-disulfo-1-naphthylamino group, a 3,6,8-trisulfo-2-naphthylamino group, a 4,6,8-trisulfo-2-naphthylamino group, a 3,6,8-trisulfo-1-naphthylamino group, and the like.

A typical example of an aralkylamino group includes, for example, a benzylamino group, and a typical example of a cycloalkylamino group includes, for example, a cyclohexylamino group, and a typical example of a phenoxy group, which may be substituted with a sulfonic acid group, a carboxylic group, an acetylamino group, an amino group, a hydroxyl group, a phenoxy group or a phenyl group includes, for example, a phenoxy group, a 4-sulfophenoxy group, a 4-carboxyphenoxy group, a 4-acetylaminophenoxy group, a 4-hydroxyphenoxy group, a 4-phenoxyphenoxy group, a 4-(4-carboxyphenoxy)phenoxy group, a 4-phenylphenoxy group, and the like. X' is preferably a 2-carboxyanilino group, 2-sulfoanilino group, a 2,5-disulfoanilino group, a 4-methyl-2-sulfoanilino group, a 2-methyl-4-sulfoanilino group, a 4-methoxy-2-sulfoanilino group, a 2-carboxy-5-sulfoanilino group and a 2-carboxy-4-sulfoanilino group, particularly preferable, a 2-carboxyanilino group, a 2-sulfoanilino group, a 2,5-disulfoanilinogroup, a 2-carboxy-5-sulfoanilino group and a 2-carboxy-4-sulfoanilino group.

A typical example of an alkylthio group (whose alkyl group may have a substituent selected from the group consisting of a sulfonic acid group, a carboxyl group and a hydroxyl group) in Y' of the formula (1') includes, for example, a $C_{1-8}$ alkylthio group such as a methylthio group, an ethylthio group, a n-propylthio group, an iso-propylthio group, a n-butylthio group, a sec-butylthio group, a tert-butylthio group, a n-hexylthio group, an-octylthio group and a tert-octylthio group, and an alkyl group in the alkylthio group having a sulfonic acid group or a carboxyl group includes, for example, a $C_{1-8}$ alkyl group such as a methyl group, an ethyl group, a n-propyl group, an iso-propyl group and a n-butyl group. A typical example of the alkylthio group having a sulfonic acid group or a carboxyl group includes, for example, a 2-sulfoethylthio group, a 3-sulfopropylthio group, a carboxymethylthio group, a 2-carboxyethylthio group, a 1-carboxyethylthio group, a 2-carboxy-2-methylethylthio group and a 1,2-dicarboxyethylthio group, and a typical example of the alkylthio group having a hydroxyl group includes, for example, a 2-hydroxyethylthio group, a 3-hydroxypropylthio group, a 4-hydroxybutylthio group, a dihydroxyethylthio group, and the like.

A typical example of the phenylthio group which may be substituted with a carboxyl group, a sulfonic acid group, a hydroxyl group, an alkyl group or an alkoxyl group includes, for example, a phenylthio group, a 2-carboxyphenylthio group, a 2-hydroxyphenylthio group, a 4-hydroxyphenylthio group, a 2-methylphenylthio group, a 2,6-dimethylphenylthio group, a 2-ethylphenylthio group, a 4-methoxyphenylthio group, a 2-sulfophenylthio group, a 4-sulfophenylthio group, and the like. A typical example of the anilino group which may be substituted with a carboxyl group, a sulfonic acid group, an alkyl group an alkoxyl group, an anilinoe group or a phenoxy group includes, for example, an anilino group, a 2-carboxyanilino group, a 3-sulfoanilino group, a 4-methoxy-2-sulfoanilino group, a 2-methyl-4-sulfoanilino group, a 2-carboxy-4-sulfoanilino group, a 2-carboxy-5-sulfoanilino group, a 4-anilino-3-sulfoanilino group, a 4-phenoxyanilino group, and the like.

A preferable combination of $R_1'$, X' and Y' includes, for example, $R_1'$ is a hydrogen atom or a methyl group; X' is an anilino group, a 2-carboxyanilino group, a 2-sulfoanilino group, a 2,5-disulfoanilino group, a benzylamino group or a cyclohexylamino group, a 2,6-dimethylanilino group, a 2,6-diethylanilino group, a 2,4,6-trimethylanilino group; and Y' is an anilino group, a 3-sulfopropylthio group, a 2-carboxyanilino group, and the like.

Suitable examples of the anthrapyridone compounds represented by the above formula (1') of the present invention are not especially limited, however, typical examples are listed in Table 2. In Table 2, (S) and 2(S) mean a sulfonic acid group and a disulfonic acid group, respectively, and (K) and 2(K) mean a carboxyl group and a dicarboxyl group, respectively.

TABLE 2

| No. | $R_1'$ | X' | Y' |
|---|---|---|---|
| 2-1 | CH3 | 2-(K)-anilino | 2-(K)-anilino |
| 2-2 | CH3 | 2,6-dimethylanilino | 2-(K)-anilino |
| 2-3 | CH3 | 2,6-dimethylanilino | anilino |
| 2-4 | CH3 | 2,6-dimethylanilino | 3-sulfopropylthio |
| 2-5 | H | 2,6-diethylanilino | 2-(K)-anilino |
| 2-6 | CH3 | 2,6-diethylanilino | 2-(K)-anilino |
| 2-7 | CH3 | 2,6-diisopropylanilino | anilino |
| 2-8 | CH3 | 2-methylanilino | 2-(K)-anilino |
| 2-9 | CH3 | benzylanilino | 2-(K)-anilino |
| 2-10 | CH3 | 2,5-2(S)-anilino | 2-(K)-anilino |
| 2-11 | CH3 | 2,5-2(S)-anilino | anilino |
| 2-12 | CH3 | 2,5-2(S)-anilino | 3-sulfopropylthio |
| 2-13 | CH3 | 2,5-2(S)-anilino | 2-hydroxyethylthio |
| 2-14 | CH3 | 2-(K)-anilino | 3-sulfopropylthio |
| 2-15 | H | 2-(K)-anilino | 2-(K)-anilino |
| 2-16 | CH3 | 2-(K)-anilino | anilino |
| 2-17 | CH3 | 2-(S)-anilino | anilino |
| 2-18 | CH3 | 2-(S)-anilino | 2-(K)-anilino |
| 2-19 | CH3 | 2-(S)-anilino | 3-sulfopropylthio |
| 2-20 | CH3 | 4-phenylphenoxy | anilino |
| 2-21 | CH3 | 4-phenylphenoxy | 2-(K)-anilino |
| 2-22 | CH3 | 3-(S)-anilino | 2-(K)-anilino |
| 2-23 | CH3 | 3-(S)-anilino | anilino |
| 2-24 | CH3 | 3-(S)-anilino | 3-sulfopropylthio |
| 2-25 | CH3 | 2-(S)-anilino | tert-octylthio |
| 2-26 | CH3 | 2-(K)-anilino | 2-(K)-ethylthio |
| 2-27 | CH3 | 2-(K)-anilino | 2-hydroxyethylthio |
| 2-28 | CH3 | 2-(K)-anilino | 1,2-2(K)-ethylthio |
| 2-29 | C2H4OH | 2,6-diethylanilino | 2-(K)-anilino |
| 2-30 | CH3 | 4-methoxy-2-(S)-anilino | 3-sulfopropylthio |
| 2-31 | CH3 | 4-methoxy-2-(S)-anilino | 2-(K)-anilino |
| 2-32 | CH3 | 2(K)-5-(S)-anilino | 2-(K)-anilino |
| 2-33 | C4H9 | 2,5-2(K)-anilino | 3-sulfopropylthio |
| 2-34 | CH3 | 2-(K)-5-(S)-anilino | 2-hydroxyethylthio |
| 2-35 | CH3 | 3-(K)-anilino | 2-(K)-anilino |
| 2-36 | CH3 | 4-(K)-anilino | 2-(K)-anilino |
| 2-37 | CH3 | 5-(K)-2-methylanilino | 2-(K)-anilino |
| 2-38 | CH3 | 4-(S)-naphthyl-1-ylamino | 2-(K)-anilino |
| 2-39 | CH3 | 2-(K)-anilino | phenylthio |

TABLE 2-continued

| No. | $R_1'$ | X' | Y' |
|---|---|---|---|
| 2-40 | CH3 | 2-(K)-anilino | 2-(K)-phenylthio |
| 2-41 | CH3 | 2,4,6-trimethylanilino | 2-(K)-anilino |
| 2-42 | CH3 | cyclohexylamino | 2-(K)-anilino |
| 2-43 | CH3 | 2-ethylhexylamino | 2-(K)-anilino |
| 2-44 | CH3 | N,N-diethylpropylamino | 2-(K)-anilino |

The anthrapyridone compound represented by the formula (1) of the present invention is produced, for example, by the following methods: That is, 1 mole of the compound of the following formula (3):

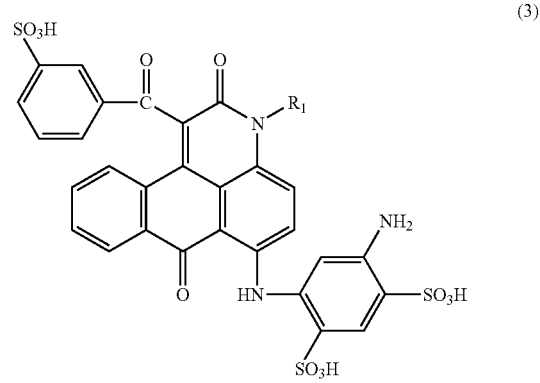

(wherein $R_1$ represents the same meaning as the above) is reacted with 1 to 1.3 moles of 2,4,6-trichloro-S-triazine (cyanuric chloride) in water at pH of 2 to 7, at 5 to 35° C. for 2 to 8 hours to obtain the first condensate represented by the formula (4):

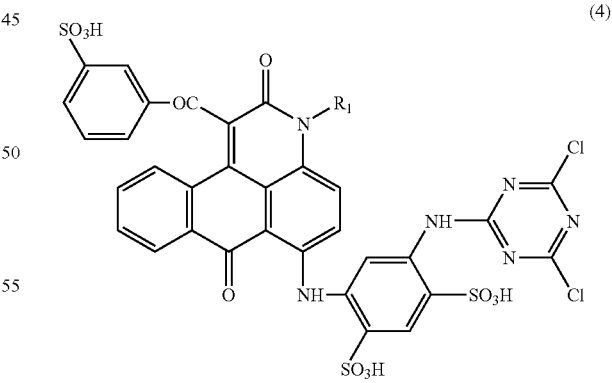

(wherein $R_1$ represents the same meaning as the above), and this compound is subsequently reacted with 1 mole of an amine corresponding to X in the formula (1) at pH of 4 to 9, at 5 to 90° C. for 10 minutes to 5 hours to obtain the compound represented by the formula (5) having a chlorine atom as Y, as the second condensate:

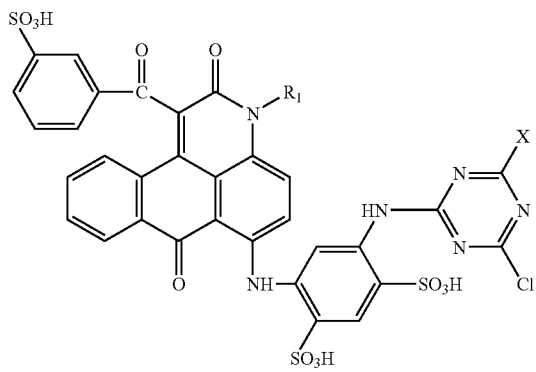

(5)

wherein $R_1$ and X represent the same meaning as the above.

Subsequently, this condensate is subjected to hydrolysis at pH of 9 to 12, at 50 to 100° C. for 10 minutes to 5 hours or reaction with ammonia or a corresponding amine at pH of 8 to 10, at 50 to 100° C. for 10 minutes to 8 hours to obtain the compound of the formula (6), wherein Y is other than a chlorine atom, as the third condensate:

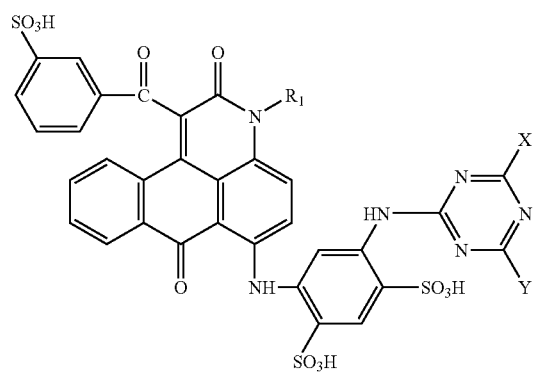

(6)

wherein $R_1$, X and Y represent the same meaning as the above.

The anthrapyridone compound represented by the formula (1') can also be obtained similarly.

In the above procedure, the order of condensation reactions may be determined as appropriate depending on reactivities of various compounds and not limited to the above.

The compound thus obtained above is present in free acid form or a salt form thereof. In the present invention, the compound can be used as a free acid or a salt such as an alkali metal salt, an alkaline earth metal salt, an alkylamine salt, an alkanolamine metal salt or an ammonium salt. Preferably included are an alkali metal salt such as a sodium salt, a potassium salt and a lithium salt; an alkanolamine salt such as a monoethanolamine salt, a diethanolamine salt, a triethanolamine salt, a mono-iso-proanolamine salt, adi-iso-propanolamine salt, a tri-iso-propanolamine salt; and an ammonium salt. As for a production method for the salt, for example, by adding sodium chloride to the reaction solution of the third condensate obtained above, followed by salting out and filtering, a sodium salt is obtained as a wet cake, which is then subjected to dissolution again in water and subsequently by adjusting the pH at 1 to 2 by the addition of hydrochloric acid to obtain crystals. The crystals obtained are separated by filtration to obtain as a free acid form (or partially a sodium salt form as it is). Further, under stirring this wet cake of free acid form with water, by making the solution alkaline with the addition of, for example, potassium hydroxide, lithium hydroxide or ammonium water, a sodium salt, a lithium salt or an ammonium salt can be obtained, respectively.

By the way, the anthrapyridone compound of the formula (3) is obtained, for example, by the following methods. That is, 1 mole of the anthrapyridone compound of the following formula (7):

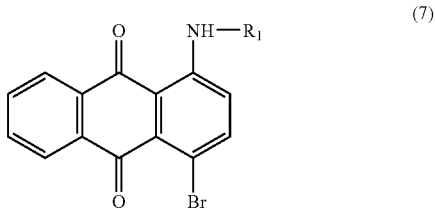

(7)

(wherein $R_1$ represents the same meaning as the above) is reacted with 1.1 to 3 moles of ethyl benzoylacetate in a polar solvent such as xylene in the presence of a basic compound such as sodium carbonate at 130 to 18° C. for 5 to 15 hours to obtain the compound of the following formula (8):

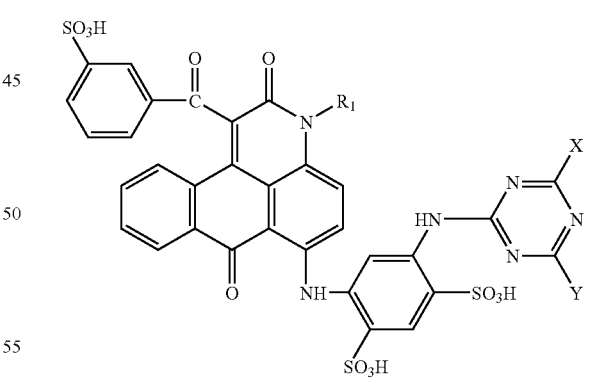

(6)

(wherein $R_1$ represents the same meaning as the above).

Subsequently, 1 mole of the compound of the formula (8) is subjected to condensation by Ulmann reaction with 1 to 5 moles of m-aminoacetanilide in an aprotic polar organic solvent such as N,N-dimethyl formamide in the presence of a basic compound such as sodium carbonate and a copper catalyst such as copper acetate at 110 to 150° C. for 2 to 6 hours to obtain the compound of the following formula (9):

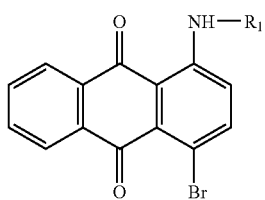

(wherein R₁ represents the same meaning as the above).

Subsequently by sulfonation of the compound of the formula (9) and hydrolysis of an acetylamino group in 8 to 15% of fumed sulfuric acid at 50 to 120° C., the anthrapyridone compound of the general formula (3):

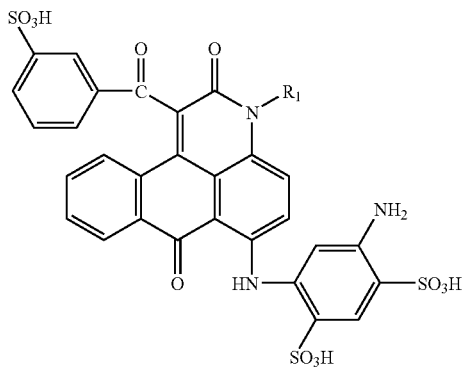

(wherein R₁ represents the same meaning as the above) can be obtained.

The anthrapyridone compounds represented by the formula (1) or the formula (1') of the present invention (hereinafter may sometimes be simply referred to as the compounds represented by the formula (1)) or the salts thereof can be used as magenta dyestuffs for coloring, and are preferable, in particular, as dyestuffs for ink. When they are used for ink, it is preferable that said compounds are water-soluble salts.

The water-based magenta ink composition of the present invention (hereinafter may sometimes be referred to as simply "ink") contains the compound of the above formula (1) or the formula (1') or the salt thereof (hereinafter the compound of the formula (1) and a salt thereof may sometimes be referred to simply as "dyestuff of formula (1)") as a dyestuff component and said composition can be obtained by dissolving said dyestuff into water or, if necessary, water containing a water-soluble organic solvent (which includes a dissolution co-agent, the same hereinafter) (hereinafter may sometimes be referred to simply as a water-based solvent). Said ink preferably has pH of about 6 to 11. When this water-based ink is used as an ink for ink-jet recording, a dyestuff component with lower content of an inorganic substance such as chloride and sulfate of a metal cation is preferable, and general standard of the total content of sodium chloride and sodium sulfate is 1% by weight or lower. To produce the dyestuff component of the present invention having lower inorganic substance, an operation for desalting can be repeated, for example, an ordinary method by a reverse osmosis membrane or a method for subjecting a dried dyestuff component or a wet cake of the dyestuff component of the present invention to necessary number of stirring in a mixed solvent of methanol and water, filtering and drying.

In a ink-jet printer, aiming at providing highly fine image, there are a cyan ink and a magenta ink set with two kinds of inks, that is, a high concentration ink and a low concentration ink. In this case, a high concentration ink containing dyestuff of formula (1) of the present invention and a low concentration ink containing dyestuff of formula (1) of the present invention can be used in combination as the ink set. Further, dyestuff of the above formula (1) satisfying the above conditions can be used in combination with known magenta dyestuff.

The ink of the present invention is prepared using water as a medium as described above. The ink of the present invention contains usually 0.3 to 8% by weight of dyestuff of the above formula (1) obtained as described above. The remaining is water and a water-soluble organic solvent, added as needed, and other ink modifiers. These components added optionally are within the content range not impairing the effect of the present invention. The water-soluble organic solvent is used as a dye-dissolving agent, an agent for prohibiting dryness (a wetting agent), a viscosity modifier, a penetration promoter, a surface tension modifier, an antifoaming agent, and the like. Other ink modifiers include known additives such as an antiseptics-fungicide, a pH controller, a chelate agent, an antirust agent, an ultraviolet absorber, a viscosity modifier, a dye-dissolving agent, a fading inhibitor, an emulsion stabilizer, a surface tension modifier, an antifoaming agent, a dispersing agent and a dispersion stabilizer. Content of the water-soluble organic solvent is usually 0 to 60% by weight, preferably 10 to 50% by weight based on the total amount of an ink and the other ink modifiers are usually used in 0 to 20% by weight, preferably 0 to 15% by weight.

The above water-soluble organic solvent includes, for example, $C_{1-4}$ alkanols such as methanol, ethanol, n-propanol, isopropanol, n-butanol, isobutanol, sec-butanol and tert-butanol; carboxamides such as N,N-dimethyl formamide and N,N-dimethyl acetamid, preferably a lower alkylamide of a lower aliphatic carboxylic acid; heterocyclic ketones such as 2-pyrrolidone, N-methyl-2-pyrrolidone, 1,3-dimethyimidazolidin-2-one or 1,3-dimethylhexahydropyrimidine-2-one, preferably a 5 to 6 membered cyclic ketone containing a nitrogen atom; ketones or keto-alocohols such as acetone, methyl ethyl ketone and 2-methyl-2-hydroxypentane-4-one, preferably a $C_{1-8}$ aliphatic ketone or ketoalcohol; cyclic ethers such as tetrahydrofuran and dioxane, preferably a $C_{1-8}$ cyclic ether; monomers or oligomers having a ($C_{2-6}$) alkylene unit or poly($C_{2-6}$)alkylene glycols or thioglycols such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol and polypropylene glycol; polyol(triol) such as glycerine and hexane-1,2,6-triol, preferably a $C_{3-8}$ aliphatic triol; ($C_{1-4}$) alkyl ethers of polyhydric lower alcohols such as ethylene glycol monomethyl ether or ethylene glycol monoethyl ether or diethylene glycol monomethyl ether, diethylene glycol monoethyl ether or triethylene glycol monomethyl ether or triethylene glycol monoethyl ether; γ-butyrolactone or dimethylsulfoxide.

Preferable one among them includes isopropanol, glycerine, mono, di- or triethylene glycol, dipropylene glycol, 2-pyrrolidone and N-methyl-2-pyrrolidone, and isopropanol, glycerine, diethylene glycol and 2-pyrrolidone are more preferable. These water-soluble organic solvents are used alone or as a mixture.

The antiseptics-fungicide includes an organosulfur type, an organonitrogen sulfur type, an organohalogen type, a haloarylsulfone type, an iodopropargyl type, an N-haloalkylthio type, a benzothiazole type, a nitrile type, a pyridine type, am 8-oxyquinoline type, a benzothiazole type, an isothiazoline type, a dithiol type, a pyridine oxide type, a nitropropane type, an organotin type, a phenol type, a quaternary ammonium salt type, a triazine type, a thiadiazine type, an anilide type, an adamantane type, a dithiocarbamate type, a brominated indanone type, a benzylbromacetate type, an inorganic salts, etc. The organohalogen type compound includes, for example, sodium pentachlorophenolate, and the pyridine oxide type compound includes, for example, 2-pyridinethiol-1-oxide sodium salt, and the inorganic salt type compound includes, for example, anhydrous sodium acetate, and the isothiazoline type compound includes, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride and 2-methyl-4-isothiazoline-3-one calcium chloride. Other antiseptics-fungicide includes sodium sorbate, sodium benzoate, and the like (for example, Proxcel GXL(S) (trade name)) and Proxcel XL-2(S) (trade name), and the like manufactured by Abesia Co., Ltd.).

As for the pH adjustor, any substance can be used as far as it can control the pH of an ink within the range at 6.0 to 11.0 to improve storage stability of an ink. For example, lower alkanolamines such as diethanolamine and triethanolamine; alkali metal hydroxides such as lithium hydroxide, sodium hydroxide and potassium hydroxide; ammonium hydroxide; and alkali metal carbonates such as lithium carbonate, sodium carbonate and potassium carbonate are included.

As the chelate agent, for example, an ethylendiaminetetraacetic acid tetrasodium salt, a nitrilotriacetic acid trisodium salt, a hydroxyethylethylenediamine triacetic acid trisodium salt, a diethylenetriamine pentaacetic acid pentasodium salt and a uramildiacetic acid disodium salt are included. A corrosion inhibitor includes, for example, an acidic sulfite, sodium thiosulfate, ammonium thioglycolate, diisopropylammonium nitrite, pentaerithritol tetranitrate, dicyclohexylammonium nitrite, etc.

As the ultraviolet absorber, for example, a benzophenone type compound, a benzotriazole type compound, a cinnamic acid type compound, a triazine type compound, a stilbene type compound, or a compound which emits fluorescence by absorbing ultraviolet rays, represented by a benzoxazole type compound, a so-called fluorescent whitening agent can also be used.

As the viscosity modifier, a water soluble polymer compound is exemplified, for example, polyvinyl alcohol, cellulose derivatives, polyamine, polyimine, and the like, besides a water soluble organic solvent.

As the dye dissolving agent, for example, urea, e-caprolactam, ethylene carbonate, and the like are included.

The fading inhibitor is used to improve image storage ability. As the fading inhibitor, various kinds of an organic-based or a metal complex-based fading inhibitor can be used. As the organic fading inhibitor, for example, hydroquinones, alkoxyphenols, dialkoxyphenols, phenols, anilines, amines, indanes, chromans, alkoxyanilines, heterocycles, and the like are included. As a metal complexe, a nickel complex, a zinc complex, and the like are included.

As the surface tension modifier, surfactants such as an anionic surfactant, an amphoteric surfactant, a cationic surfactant and a nonionic surfactant are included. As the anionic surfactant, salts such as alkylsulfocarboxylate, a-olefinsulfonate, polyoxyethylenealkylether acetate, N-acylamino acids and salts thereof, N-acylmethyltaurine salts, alkylsulfate polyoxyalkylethersulfate, alkylsulfate polyoxyethylenealkyletherphosphate, rosin acid soap, castor oil sulfate, lauryl alcohol sulfate, alkylphenol phosphate, alkyl phosphate alkylaryl sulfonate, diethyl sulfosuccinate, diethylhexyl sulfosuccinate and dioctyl sulfosuccinate are included. As the cationic surfactant, poly(2-vinylpyridine) derivatives and poly(4-vinylpyridine) derivatives are included. As the amphoteric surfactant, lauryldimethylaminoacetic acid betaine, 2-alkyl-N-carboxymethyl-N-hydroxyethylimidazolium betaine, palm oil fatty acid amide propyl dimethylamino acetic acid betaine, polyoctylpolyaminoethyl glycine and other imidazolidine derivatives are included. As the nonionic surfactant ethers such as polyoxyethylene nonylphenyl ether, polyoxyethylene octylphenyl ether, polyoxyethylene dodecylphenyl ether, polyoxyethylene octylphenyl ether, polyoxyethylene oleylphenyl ether, polyoxyethylene lauryl ether, polyoxyethylene alkyl ethers and polyoxyethylene aralkyl alkyl ether; polyoxyethylene oleic acid; esters such as polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; acetylene glycols such as 2,4,7,9-tetramethyl-5-decyn-4,7-diol, 3,6-dimethyl-4-octyn-3,6-diol and 3,5-dimethyl-1-hexyn-3-ol (for example, Surfinol-104E, -104PG50, -82, -465, Olfin-STG, manufactured by Nisshin Chem. Co., Ltd.) are included.

These ink modifiers are used alone or as a mixture. In this connection, surface tension of an ink according to the present invention is usually 25 to 70 mN/m, more preferably 25 to 60 mN/m. And viscosity of an ink according to the present invention is preferably 30 mPa·s or lower. Further, it is more preferable to adjust it to 20 mPa·s or lower.

The water-base ink composition of the present invention can be obtained by mixing and stirring each of the above components in arbitrary order. The ink composition obtained may be subjected to filtration with a membrane filter, and the like to remove foreign matters.

Recording materials in an ink-jet recording method of the present invention are not especially limited as long as they are recordable materials by ink-jetting. For example, an information transmission sheet such as a paper and a film, fiber and leather are included. It is preferable that the information transmission sheet is a surface treated one, typically an ink receiving layer is set on these substrates. The ink receiving layer can be set by, for example, impregnation or coating a cationic polymer onto the above substrate or coating inorganic fine particles which can adsorb dyestuff in ink such as porous silica, alumina sol or special ceramics, along with ahydrophilic polymer such as polyvinylalcohol or polyvinyl pyrrolidone onto the surface of the above substrate. These materials set with the ink receiving layer are generally called as an ink-jet paper (film), a glossy paper (film), and they are commercially sold, for example, as Pictoriko (trade name: manufactured by Asahi Glass Co. Ltd.), Color BJ Paper, Color BJ Photofilm Sheet (all of these are trade names: manufactured by Canon Inc.), Color Image Jet Paper (trade name: manufactured by Sharp Co., Ltd.), Super Fine Glossy Film (trade name: manufactured by Seiko Epson Co., Ltd.), PictaFine (trade name: manufactured by Hitachi Maxell, Ltd.), and the like. Naturally, plain papers without these ink receiving layer set can also be utilized.

As for fibers, a cellulose fiber, or a polyamide fiber such as nylon, or silk, wool, and the like are preferable and non-woven fabric or cloth-like fiber is preferable. By subjecting these fibers to a fastening process by wet heating (for example, at about 80 to 12° C.) or dry heating (for example, at about 150 to 18° C.), after furnishing the ink composition of the present invention to said fiber, preferably after furnishing by means of an ink-jet method, dyestuff can be fixed inside said fibers and thus dyed products superior in vividness, light fastness and washing fastness can be provided.

A container of the present invention contains the above water-based magenta ink composition. An ink-jet printer of the present invention is equipped with the container of the present invention containing the above water-based magenta ink composition at the ink tank part. Further, a colored article of the present invention is obtained by coloring a material to be colored by a usual method, for example, coating, printing, impregnation, and the like, by using the new anthrapyridone compound of the above formula (1) or the salt thereof, as it is or as a composition formulated with additives, if necessary, and is preferably one colored by the above water-based magenta ink composition.

The water-based ink composition of the present invention provides vivid printed surface as well as nearly ideal magenta color, and can provide a recorded article superior, in particular, ozone gas fastness, along with fastness to light, humidity and water. The composition, when used together with a yellow or cyan ink, can provide wide visible ray range of color tone and moreover, when used together with a conventional yellow, cyan, or black ink superior in fastness to ozone gas, light, humidity and water, can provide a recorded article superior in fastness to ozone gas, light, humidity and water.

EXAMPLES

The present invention will be described below in more details with reference to Examples. "Parts" and "%" in the description are shown by mass unless otherwise specified.

Example 1-1

(1) To 360 parts of xylene were added 94.8 parts of the compound of the formula (7) ($R_1$=$CH_3$), 3.0 parts of sodium carbonate and 144.0 parts of ethyl benzoylacetate successively under stirring, followed by raising the temperature. The solution was reacted at 140–150° C. for 8 hours and the formed ethanol and water during the reaction were removed by azeotropic distillation with xylene to complete the reaction. Successively, the solution was cooled, then 240 parts of methanol was added thereto at 30° C. After stirring for 30 minites, by filtering, then washing with 360 parts of methanol, and drying, 124.8 parts of the compound of the formula (8) ($R_1$=$CH_3$) were obtained as a pale yellow needle crystal.

(2) To 300.0 parts of N,N-dimethyl formamide were then added 88.8 parts of the compound of the formula (8) ($R_1$=$CH_3$), 75.0 parts of m-aminoacetanilide, 24.0 parts of copper acetate monohydrate and 12.8 parts of sodium carbonate successively under stirring, followed by raising the temperature. Reaction was carried out at 120 to 130° C. for 3 hours. Cooling the solution to about 50° C., 120 parts of methanol was added thereto, and the solution was stirred for 30 minutes. Thereafter, by filtering, washing with 500 parts of methanol and then with hot water of 80° C., and drying, 79.2 parts of the compound of the formula (9) ($R_1$=$CH_3$) were obtained as bluish red crystal.

(3) Then, to 130 parts of 98.0% sulfuric acid were added 170.0 parts of 28.0% fuming sulfuric acid under stirring and water cooling to prepare 300 parts of 12% fuming sulfuric acid. The compound of the formula (9) ($R_1$=$CH_3$) of 51.3 parts was added thereto under water cooling at 50° C. or below, followed by raising the temperature. Reaction was carried out at 85 to 90° C. for 4 hours. Consequently, into 600 parts of ice water was added the above obtained sulfonated solution keeping the temperature at 50° C. or below by adding ice. Water was added thereto to make the solution of 1000 parts, followed by filtering the solution to remove insoluble matter. To the filtrate was added hot water to make the solution of 1500 parts, successively 300 parts of sodium chloride were added thereto while keeping at 60 to 65° C., and then the solution was stirred for 3 hours. The precipitated crystals were separated by filtration, washed with 300 parts of a 20% aqueous solution of sodium chloride and squeezed well to obtain 100.3 parts of a wet cake containing 59.2 parts of the compound of the formula (3) ($R_1$=$CH_3$) (purity 45.9% by a diazo analysis method; the same hereinafter) as red crystal.

(4) Into 60 parts of water were added 67.7 parts of the wet cake of the compound of the formula (3) ($R_1$=$CH_3$) (purity 45.9%) obtained in the above (3), and subsequently 24 parts of a 25% sodium hydroxide solution were added thereto and the mixture was stirred to dissolve while further adding a 25% sodium hydroxide solution to adjust the pH at 3 to 4.

On the other hand, to 60 parts of ice water was added 0.4 parts of Lipal OH (trade name, an anionic surfactant by Lion KK) and dissolved. Then cyanuric chloride of 8.9 parts was then added to the solution, followed by stirring for 30 min. The suspension solution obtained was added to the solution containing the compound of the above formula (3), followed by dropping a 10% aqueous sodium hydroxide solution to maintain the pH at 2.7 to 3.0 for 3 hours for the first condensation reaction at 25 to 30° C. to obtain the reaction solution containing the compound of the formula (4) ($R_1$=$CH_3$).

(5) To the reaction solution of the above (4) containing the compound of the formula (4) ($R_1$=$CH_3$) was added a solution consisting of 8.4 parts of orthanilic acid (purity of 98.89%), 40 parts of water and 8 parts of a 25% aqueous solution of sodium hydroxide, further was added water to make the solution of 300 parts, followed by raising the temperature and dropping a 10% aqueous sodium hydroxide solution at 60 to 70 to maintain the pH at 6.0 to 6.5 for 1 hour for the second condensation reaction to obtain the reaction solution containing the compound of the formula (5) ($R_1$=$CH_3$, X=2-sulfoanilino group).

(6) While maintaining the pH at 10.0 to 10.2 by addition of a 25% aqueous sodium hydroxide solution to the reaction solution containing the compound of the formula (5) ($R_1$=$CH_3$, X=2-sulfoanilino group) obtained in the above (5), the reaction was carried out at 85 to 90° C. for 1 hour. After the reaction, water was added to adjust amount of the reaction solution to 400 parts, and insoluble matter was removed by filtration.

To the reaction solution obtained was added water to adjust amount of the solution to 500 parts. While keeping temperature at 50 to 55° C., 100 parts of sodium chloride were added to the solution, followed by adding conc. hydrochloric acid to adjust the pH at 0.5. Then the solution was stirred for 1 hour and precipitated crystals were separated by filtration, and washed with 200 parts of a 20% aqueous sodium chloride solution to obtain 92 parts of the compound of the formula (6) ($R_1$=$CH_3$, X=2-sulfoanilino group and Y=OH) as a red wet cake.

(7) The wet cake obtained in the above (6) was added into 200 parts of methanol and dissolved by heating to 60 to 65° C. The solution was stirred for 1 hour at about 5° C. under ice cooling, and the precipitated crystals were separated by filtration, washed with methanol and dried to obtain 25.6 parts of the compound of the following formula (1-10) (a compound of No. 1-32 in Table 1) as red crystal.

λ max: 545.0 nm (in water)

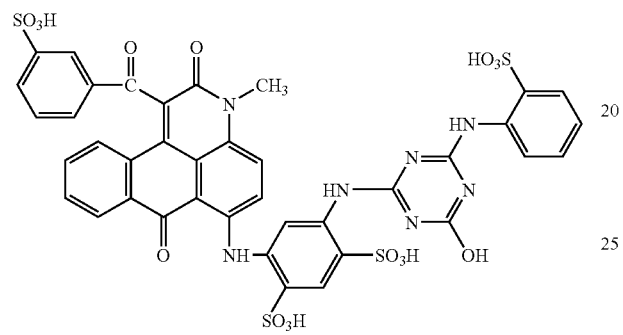

(1-10)

Example 1-2

(1) To 100 parts of ice water was added 0.4 parts of Lipal OH to dissolve. Cyanuric chloride of 8.9 parts was then added to the solution, followed by stirring for 30 min. To the suspension solution obtained were added 13.2 parts of 2,5-disulfoaniline (AS acid) (purity of 91.7%) and, while dropping a 25% aqueous sodium hydroxide solution to maintain the pH at 2.7 to 3.3, reaction was carried out at 15 to 20° C. to obtain the first condensation reaction solution. Subsequently, 67.7 parts of the wet cake (purity of 45.9%) of the compound of the formula (3) obtained in (3) of Example 1 were added and then while adding 24 parts of a 25% aqueous sodium hydroxide solution to maintain the pH at 5 to 6, the second condensation reaction was carried out at 60 to 70° C. for 4 hours to obtain the reaction solution containing the compound of the formula (5) (wherein $R_1$=$CH_3$, X=2,5-disulfoanilino group).

(2) While maintaining the pH at 10.8 to 11.2 by addition of 25% aqueous sodium hydroxide solution to the reaction solution obtained in the above (1), reaction was carried out at 90 to 95° C. for 1 hour. After the reaction, water was added to adjust the reaction solution to 400 parts and insoluble matter was removed by filtration. Water was added to adjust the obtained reaction solution to 500 parts and 100 parts of sodium chloride were added while heating and maintaining at about 60 to 65° C., then hydrochloric acid was added to adjust the pH at 0.5, followed by stirring for 30 minutes. Crystals obtained were filtered and washed with 200 parts of a 20% aqueous solution of sodium chloride to obtain the compound of the formula (6) (wherein $R_1$=$CH_3$, X=2,5-disulfoanilino group and Y=OH) as a bright red wet cake.

(3) The wet cake obtained in the above (2) was added in 500 parts of methanol, followed by stirring at 20 to 25° C. for 1 hour. Crystals deposited were filtered, washed with methanol, and dried to obtain 31.3 parts of the compound of the formula (1-11) (the compound of No. 1-1 in Table 1) as red crystals.

λ max: 543.0 nm (in water)

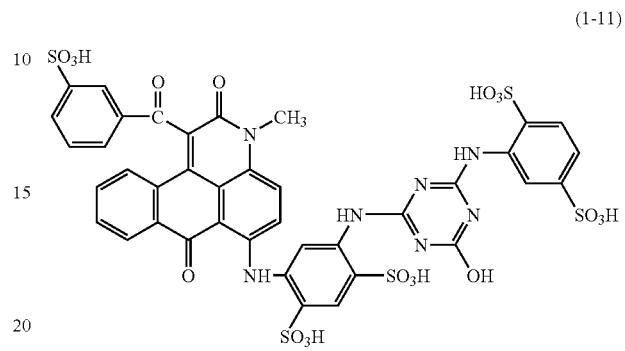

(1-11)

Example 1-3

(A) Preparation of an Ink

Each water-based magenta ink composition for ink-jetting was produced by preparing each ink composition containing each of the anthrapyridone compounds (dyestuff components) obtained in Example 1-1 and Example 1-2, which has a composition of Table 3 shown below, followed by filtering through a 0.45 μm membrane filter. Ion exchanged water was used for the water. Water and ammonium hydroxide were added to adjust the ink composition to be 100 parts in total quantity and the pH at 8 to 10.

TABLE 3

| | |
|---|---|
| Dyestuff component obtained in Example 1-1 or 1-2 (desalinated one was used) | 5.0 parts |
| Water + Ammonium hydroxide | 75.9 parts |
| Glycerin | 5.0 parts |
| Urea | 5.0 parts |
| N-methyl-2-pyrrolidone | 4.0 parts |
| IPA (isopropylalcohol) | 3.0 parts |
| Butylcarbitol | 2.0 parts |
| Surfactant (Surfinol 104PG50, by Shinetsu Chemical Co., Ltd.) | 0.1 parts |
| Total | 100.0 parts |

(B) Ink-jet Printing

By using an inkjet-printer (Trade name: BJ S-630, by Canon KK), ink-jet recordings were performed on four types of recording paper: Plain Paper, Professional Photo Paper (PR-101, by Canon KK), Photo Glossy Film (HG-201, by Canon KK) and PM Photo Paper <Glossy> (by Seiko-Epson KK). (hereinafter, PR refers to Professional Photo Paper; HG refers to Photo Glossy Film; and PM refers to PM Photo Paper <Glossy>)

In printing, image patterns were prepared so that reflection concentration can be obtained in several step tones. In the following experiments, measurement was carried out using a tone part of a printed article before the test, having reflection concentration D value nearest to 1.0.

(C) Evaluation of Recorded Image (1) Hue Evaluation

Hue and Vividness of Recorded Image: A recorded paper was subjected to color determination using the colorimeter (GRETAG MACBETH SPECTROEYE, by GRETAG Co.) to calculate L*, a*, b* values. Vividness was calculated by the equation: $C^*=((a^*)^2+(b^*)^2)^{1/2}$. Results are shown in Table 4.

(2) Light Fastness Test

Xenon Weather Meter (by Atlas Co. Ltd.) was used to irradiate on the recorded images at 24° C., 60% RH for 50 hrs. Color density (D value) was measured before and after the irradiation by the above color determination system to calculate residual rate by the following equation:

Residual rate (%)=D value after the irradiation/D value before the irradiation ×100

The results are shown in Table 4.

(3) Ozone Gas Fastness Test

A piece of printed recording paper was placed in Ozone Weather Meter (an OMS-H model by Suga Testing Machine Co.) for testing and kept under the condition of 24° C., 12 ppm and 60% RH for 2 hrs. Color density (D value) was measured before and after the test to calculate residual rate by the following equation:

Residual rate (%)=D value after the irradiation/D value before the irradiation ×100

The results are shown in Table 4.

The test results on hue, vividness, light fastness and ozone gas fastness of the recorded images are listed in Table 4, wherein Evaluation Example 1-1 shows the results of the evaluation of the ink composition produced from the compound obtained in Example 1-1 and so as Evaluation Example 1-2 shows the results of the evaluation of the ink composition produced from the compound obtained in Example 1-2. Further, Table 4 also includes Comparative Example 1 which shows the evaluation result by use of the anthrapyridone compound (Compound No. 4) described in Example 2 of patent literature 3.

TABLE 4

| | Hue | | | | Vividness | Light-fastness (residual rate %) | Ozone-fastness (residual rate %) |
|---|---|---|---|---|---|---|---|
| | L* | a* | b* | C* | | | |
| Evaluation Example 1-1 | | | | | | | |
| Plain paper | 47.7 | 60.4 | −17.1 | 62.8 | | 96 | 99 |
| PR | 56.7 | 70.2 | −33.3 | 77.7 | | 96 | 91 |
| HG | 57.1 | 70.8 | −33.5 | 78.3 | | 96 | 89 |
| PM | 58.0 | 70.2 | −34.2 | 78.1 | | 97 | 96 |
| Evaluation Example 1-2 | | | | | | | |
| Plain paper | 50.1 | 62.8 | −15.7 | 64.7 | | 96 | 99 |
| PR | 57.8 | 72.5 | −31.7 | 79.1 | | 89 | 97 |
| HG | 58.4 | 71.1 | −31.1 | 77.7 | | 86 | 98 |
| PM | 59.5 | 72.5 | −33.2 | 79.4 | | 95 | 99 |
| Comparative Example 1 | | | | | | | |
| Plain paper | 52.6 | 57.6 | −0.6 | 57.6 | | 96 | 99 |
| PR | 59.0 | 69.2 | −14.0 | 70.6 | | 85 | 51 |
| HG | 58.8 | 68.9 | −15.8 | 70.7 | | 83 | 61 |
| PM | 60.6 | 68.1 | −14.8 | 69.7 | | 89 | 65 |

C* values in Evaluation Examples 1 and 2 in Table 4 are higher than that in Comparative Example 1, thus proving higher vividness. Also residual rates in ozone gas fastness in Evaluation Examples 1 and 2 are higher than that in Comparative Example 1, thus proving significantly improved image stability against ozone gas, and the like. Further, Examples 1 and 2 show higher light fastness than that in Comparative Example 1, thus proving that the anthrapyridone compound of the present invention is a superior compound as magenta dyestuff for ink-jet.

Example 1-4

(1) To the reaction solution containing the compound of the formula (5) ($R_1$=$CH_3$ and X=2-sulfoanilino group) obtained as in (5) of Example 1-1 was added 24 parts of conc. ammonium water (28%), followed by heating to 90° C. for reaction for 30 minutes. After the reaction, insoluble matter was removed by filtration and water was added to adjust the reaction solution to 800 parts. Then 160 parts of sodium chloride was added while maintaining the solution temperature at 50 to 60° C., followed by the addition of conc. hydrochloric acid to adjust the pH at 0, stirring for 30 minutes and filtering crystal, which was washed with 400 parts of a 20% aqueous solution of sodium chloride to obtain 100 parts of the compound of the formula (6) (wherein $R_1$=$CH_3$, X=2-sulfoanilino group and Y=$NH_2$) as a red wet cake. (2) The wet cake obtained in the above (1) was added in 800 parts of methanol, followed by heating to 60 to 65° C., stirring, filtering, washing with methanol, and drying to obtain 29.6 parts of the compound of the following formula (1-12) (the compound of No. 1-33 in Table 1), as a red crystal.

λ max: 544.8 nm (in water)

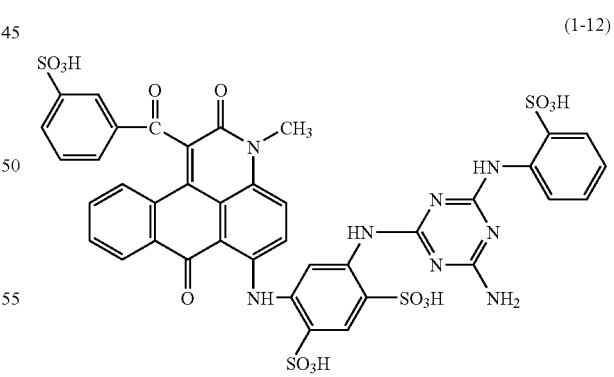

(1-12)

Example 1-5

(1) To the reaction solution containing the compound of the formula (4) ($R_1$=$CH_3$) obtained as in (4) of Example 1-1 was added a solution consisting of 10.2 parts of 4-methoxy-2-sulfoaniline (purity of 99.4%), 40 parts of water and 7.8 parts of a 25% aqueous solution of sodium hydroxide, further was added water to make the solution of 300 parts, followed by raising the solution temperature. Under dropping a 25% aqueous sodium hydroxide solution at 60 to 70° C. to maintain the pH at 5.0 to 6.0, the second condensation reaction was carried out for 30 minutes to obtain the reaction solution containing the compound of the formula (5) (wherein $R_1=CH_3$, X=4-methoxy-2-sulfoanilino group).

(2) While maintaining the pH at 10.0 to 10.2 by addition of 25% aqueous sodium hydroxide solution to the reaction solution containing the compound of the formula (5) (wherein $R_1=CH_3$, X=4-methoxy-2-sulfoanilino group) obtained in the above (1), reaction was carried out at 90° C. for 1 hour. After the reaction, insoluble matter was removed by filtration and water was added to the obtained filtrate to adjust amount of the solution to 1200 parts. Then, 240 parts of sodium chloride was added thereto at room temperature (about 20° C.) and then conc. hydrochloric acid was added thereto to adjust the pH at 0, followed by stirring for 30 minutes. Crystals obtained were separated by filtration and washed with 400 parts of a 20% aqueous solution of sodium chloride to obtain 100 parts of the compound of the formula (6) (wherein $R_1=CH_3$, X=4-methoxy-2-sulfoanilino group and Y=OH) as a red wet cake.

(3) The wet cake obtained in the above (2) was added in 800 parts of methanol, followed by stirring at room temperature (about 20° C.) for 1 hour, filtering, washing with methanol, and drying to obtain 20.4 parts of the compound of the following formula (1-13) (the compound of No. 1-36 in Table 1), as red crystals.

λ max: 541.4 nm (in water)

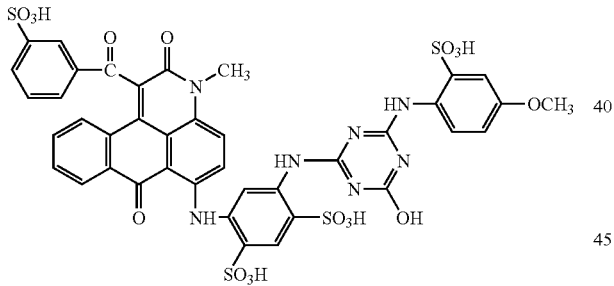

(1-13)

Example 1-6

(1) To the reaction solution containing the compound of the formula (4) ($R_1=CH_3$) obtained as in (4) of Example 1-1 was added a solution consisting of 15.0 parts of 4-sulfoanthranilic acid (purity of 76.4%), 60 parts of water and 16.8 parts of a 25% aqueous solution of sodium hydroxide, further water was added thereto to adjust amount of the solution to 400 parts and the temperature of the solution raised. Under dropping a 25% aqueous sodium hydroxide solution at 50 to 60° C. to maintain the pH at 4.5 to 5.0, the second condensation reaction was carried out for 30 minutes to obtain the reaction solution containing the compound of the formula (5) (wherein $R_1=CH_3$, X=2-carboxy-5-sulfoanilino group).

(2) While maintaining the pH at 10.0 by addition of 25% aqueous sodium hydroxide solution to the reaction solution containing the compound of the formula (5) (wherein $R_1=CH_3$, X=2-carboxy-5-sulfoanilino group) obtained in the above (1), reaction was carried out at 85 to 90° C. for 1 hour, and further carried out at 85 to 90° C. for 1 hour while maintaining the pH at 11.0. After the reaction, insoluble matter was removed by filtration and water was added to adjust the reaction solution to 600 parts. Then 120 parts of sodium chloride was added while maintaining at 30 to 35° C., then conc. hydrochloric acid was added to adjust the pH at 0.5, followed by stirring for 1 hour. Crystal obtained was filtered and washed with 60 parts of a 20% aqueous solution of sodium chloride to obtain 100 parts of the compound of the formula (6) (wherein $R_1=CH_3$, X=2-carbox-5-sulfoanilino group and Y=OH) as a red wet cake.

(3) The wet cake obtained in the above (2) was added in 600 parts of methanol and 40 parts of water, followed by heating to 60 to 65° C., stirring for 30 minutes, filtering, washing with methanol and drying to obtain 16.6 parts of the compound of the following formula (1-4) (the compound of No. 1-38 in Table 1), as red crystal.

λ max: 540.0 nm (in water)

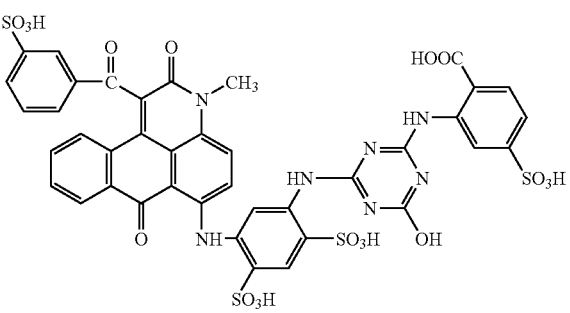

(1-14)

Example 1-7

(1) To the reaction solution containing the compound of the formula (4) ($R_1=CH_3$) obtained as in (4) of Example 1-1 was added a solution consisting of 7.9 parts of 3-carboxy-4-hydroxyaniline (purity of 98%), 40 parts of water and 8 parts of an a 25% aqueous solution of sodium hydroxide, followed by further adding water to adjust the reaction solution to 400 parts and raising the temperature. By dropping a 25% aqueous sodium hydroxide solution at 50 to 60° C. to maintain the pHat 4.5 to 5.0 for 2 hours, the second condensation reaction was carried out to obtain the reaction solution containing the compound of the formula (5) (wherein $R_1=CH_3$, X=3-carboxy-4-hydroxyanilino group).

(2) While maintaining the pH at 10.8 to 11.0 by addition of 25% aqueous sodium hydroxide solution to the reaction solution containing the compound of the formula (5) (wherein $R_1=CH_3$, X=3-carboxy-4-hydroxyanilino group) obtained in the above (1), reaction was carried out at 85 to 90 for 2 hours. After the reaction, insoluble matter was removed by filtration. Water was added to filtrate to adjust amount of the solution to 600 parts. Sodium chloride of 60 parts was added the solution while maintaining at 60 to 65° C., then conc. hydrochloric acid was added thereto to adjust the pH at 2.0, followed by stirring for 30 minutes. Crystals obtained were separated by filtration and washed with 70 parts of a 20% aqueous solution of sodium chloride to obtain 88 parts of the compound of the formula (6) (wherein $R_1=CH_3$, X=3-carboxy-4-hydroxyanilino group and Y=OH), as a red wet cake.

(3) The wet cake obtained in the above (2) was added in 800 parts of methanol, followed by heating to 65° C., stirring for 30 minutes, filtering, washing with methanol and drying to obtain 33.6 parts of the compound of the following formula (1-15) (the compound of No. 1-41 in Table 1), as red crystal.

λ max: 539.0 nm (in water)

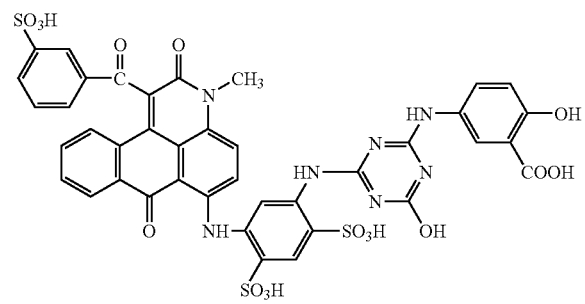

(1-15)

Example 1-8

Similarly as in (A) to (C) of Example 1-3, ink was prepared and ink-jet print recording was carried out and the recorded image was evaluate. As a recording paper in this test, however, 3 types, that is, Plain Paper, Professional Photo Paper (manufactured by Canon KK) and Super Photo Paper (SP-101 manufactured by Canon KK) were used.

(hereinafter, PR refers to Professional Photo Paper; SP refers to Super Photo Paper)

Test results of recorded image on hue, vividness, light fastness and ozone gas fastness are shown in Table 5. Evaluation Example 1-3 shows the results of the evaluation of the ink composition produced from the compound obtained in Example 1-4, Evaluation Example 1-4 shows the results of the evaluation of the ink composition produced from the compound obtained in Example 1-5, Evaluation Example 1-5 shows the results of the evaluation of the ink composition produced from the compound obtained in Example 1-6 and so as Evaluation Example 1-6 shows the results of the evaluation of the ink composition produced from the compound obtained in Example 1-7.

TABLE 5

| | Hue | | | Vividness | Light-fastness (residual | Ozone-fastness (residual |
|---|---|---|---|---|---|---|
| | L* | a* | b* | C* | rate %) | rate %) |
| Evaluation Example 1-3 | | | | | | |
| Plain paper | 47.0 | 58.7 | −19.9 | 62.0 | 97 | 99 |
| PR | 46.4 | 72.3 | −32.3 | 79.2 | 81 | 92 |
| SP | 55.6 | 71.3 | −31.2 | 77.8 | 94 | 94 |

TABLE 5-continued

| | Hue | | | Vividness | Light-fastness (residual | Ozone-fastness (residual |
|---|---|---|---|---|---|---|
| | L* | a* | b* | C* | rate %) | rate %) |
| Evaluation Example 1-4 | | | | | | |
| Plain paper | 49.3 | 59.8 | −14.4 | 61.5 | 95 | 99 |
| PR | 49.7 | 69.0 | −26.3 | 73.8 | 85 | 90 |
| SP | 58.9 | 68.3 | −25.8 | 73.0 | 92 | 91 |
| Evaluation Example 1-5 | | | | | | |
| Plain paper | 47.6 | 55.0 | −19.1 | 58.2 | 96 | 99 |
| PR | 50.0 | 65.6 | −33.1 | 73.5 | 90 | 95 |
| SP | 57.1 | 65.0 | −30.6 | 71.8 | 94 | 96 |
| Evaluation Example 1-6 | | | | | | |
| Plain paper | 47.8 | 55.8 | −16.0 | 58.0 | 98 | 99 |
| PR | 57.7 | 67.3 | −27.2 | 72.6 | 93 | 93 |
| SP | 57.7 | 67.2 | −28.4 | 73.0 | 96 | 93 |

C* values in Evaluation Examples 1-3 to 1-6 in Table 5 are high and prove to have high vividness. Also light fastness and ozone gas fastness in Evaluation Examples 1-3 to 1-6 are also significantly high, which prove that the anthrapyridone compound of the present invention is a superior compound as magenta dyestuff for ink-jetting.

Example 2-1

(1) To the reaction solution containing the compound of the formula (4) ($R_1=CH_3$) obtained as in (4) of Example 1-1 were added 13.2 parts of anthranilic acid and further added water to adjust amount of the solution to 300 parts, followed by raising the temperature. Reaction was carried out at 70 to 95° C. for 5 hours while maintaining the pH at 9.0 to 11.0 by addition of a 25% aqueous sodium hydroxide solution. After the reaction, water was added to adjust amount of the solution obtained to 400 parts and insoluble matter was removed by filtration.

Ice water was added to adjust the reaction solution obtained to 700 parts. Sodium chloride of 70 parts was added the solution while maintaining the pH at 7.0 to 8.0 at 60 to 65° C., and then conc. hydrochloric acid was added to adjust the pH at 3.0 to 3.5, followed by stirring for 1 hour. Crystals obtained were separated by filtration and washed with 200 parts of a 20% aqueous solution of sodium chloride to obtain the compound of the formula (1') (wherein $R_1'=CH_3$ and $X'=Y'=$2-carboxyanilino group) as a red wet cake.

(2) The wet cake obtained in the above (5) was added in 200 parts of methanol, followed by heating to 60 to 65° C. to dissolve, stirring at about 5° C. for 1 hour under ice cooling. Deposited crystals were separated by filtration, washed with methanol and dried to obtain 27.4 parts of the compound of the following formula (2-9) (the compound of No. 2-1 in Table 2) as dark red crystal.

λ max: 543.2 nm (in water)

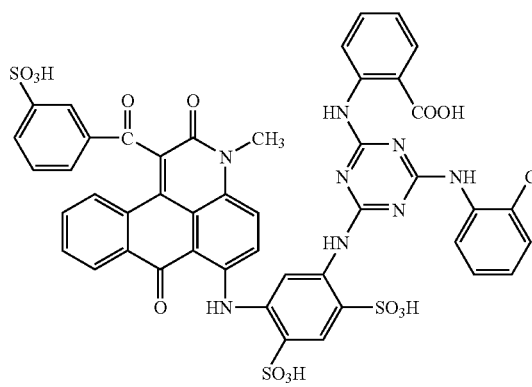

(2-9)

Example 2-2

(1) To the reaction solution containing the compound of the formula (4) ($R_1$=$CH_3$) obtained as in (1) to (4) of Example 1-1 were added 6.6 parts of anthranilic acid, and added further water to adjust amount of the solution to 200 parts. Under dropping a 25% aqueous sodium hydroxide solution at 15 to 25° C. to maintain the pH at 6.0 to 6.5 for 5 hours, the second condensation reaction was carried out to obtain the reaction solution containing the compound of the formula (1') (wherein $R_1'$=$CH_3$, X'=2-carboxyanilino group and Y=Cl).

(2) To the reaction solution obtained in the above (1) were added 10.7 parts of sodium 3-mercapto-1-propane-sulfonate, followed by reaction at 70 to 85° C. for 5 hours while adjusting the pH at 10.8 to 11.2. After the reaction, water was added to adjust amount of the solution to 400 parts and insoluble matter was removed by filtration. Water was further added to adjust the reaction solution to 500 parts and 50 parts of sodium chloride were added to the solution while maintaining the pH at 8.0 to 8.5 at about 60° C., then hydrochloric acid was added to adjust the pH at 3.0 to 3.5, followed by stirring for 30 minutes. Crystals obtained were filtered and washed with 200 parts of a 20% aqueous solution of sodium chloride to obtain the compound of the formula (1') (wherein $R_1'$=$CH_3$, X'=2-carboxyanilino group and Y=3-sulfopropylthio group), as a red wet cake.

(3) The wet cake obtained in the above (2) was added in 200 parts of methanol, followed by heating to 60 to 65° C., and dispersed. Then, after stirring for 30 minutes, crystals deposited were separated by filtration, washed with methanol and dried to obtain 34.3 parts of the compound of the following formula (2-10) (the compound of No. 2-14 in Table 2), as dark red crystal.

λ max: 541.0 nm (in water)

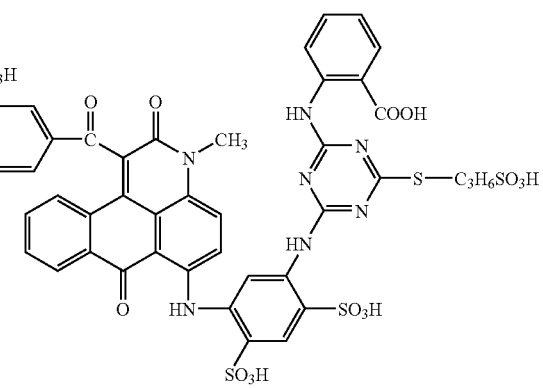

(2-10)

Example 2-3

(1) To the reaction solution containing the compound of the formula (1') ($R_1'$=$CH_3$, X'=2-carboxyanilino group and Y'=Cl) obtained as in (2) of Example 2-2 were added 4.7 parts of aniline, and, while adjusting the pH at 10.8 to 11.2 by addition of a 25% aqueous solution of sodium hydroxide, the solution obtained was heated and reacted at 70 to 95° C. for 5 hours. After the reaction, water was added to adjust the reaction solution to 400 parts and insoluble matter was removed by filtration. Water was further added to adjust the reaction solution obtained to 500 parts and 75 parts of sodium chloride was added to the solution obtained while maintaining at 60 to 65° C., then hydrochloric acid was added to adjust the pH at 2.5, followed by stirring for 30 minutes. Crystals obtained were separated by filtration and washed with 400 parts of a 15% aqueous solution of sodium chloride to obtain the compound of the formula (1') (wherein $R_1'$=$CH_3$, X'=2-carboxyanilino group and Y'=an anilino group), as a red wet cake.

(2) The reaction solution obtained in the above (1) was added into 500 parts of methanol, followed by heating at 60 to 65° C. to dissolve, ice cooling to about 5° C. and stirring for 30 minutes. Crystals obtained were filtered, washed with methanol and dried to obtain 32.0 parts of the compound of the following formula (2-11) (the compound of No. 2-16 in Table 2) as red crystal.

λ max: 541.6 nm (in water)

λ max: 542.5 nm (in water)

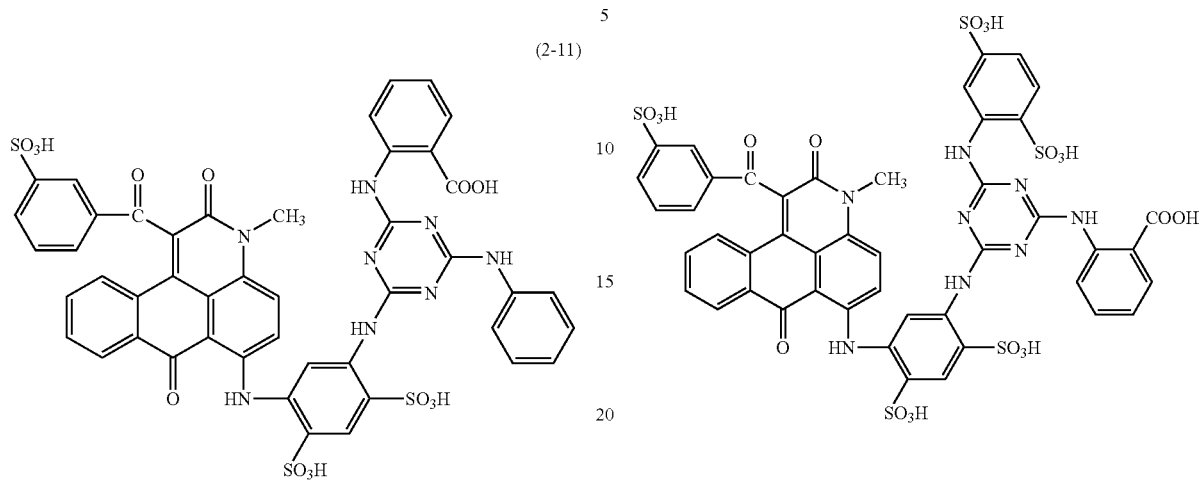

Example 2-4

Example 2-5

(1) To the reaction solution containing the compound of the formula (4) (R₁=CH₃) obtained as in (1) to (4) of Example 2-1 were added 7.6 parts of 2,6-diethylaniline and further water to adjust the reaction solution to 250 parts. While maintaining the pH at 5 to 6 by adding dropwise 25% aqueous sodium hydroxide solution to the solution obtained, the second condensation reaction was carried out for 30 minutes at 50 to 60 to obtain the reaction solution containing the compound of the formula (1') (wherein R₁'=CH₃, X'=2,6-diethylanilino group and Y=Cl).

(2) To the reaction solution obtained in the above (1) were added 6.6 parts of anthranilic acid and, while adjusting the pH at 10.3 to 10.7 by adding a 25% aqueous sodium hydroxide solution, reaction was carried out at 80 to 90° C. for 3 hours. After the reaction, water was added to adjust amount of the solution to 600 parts and insoluble matter was removed by filtration. Water was added to the reaction solution obtained to adjust amount of the solution to 800 parts. Sodium chloride of 120 parts was added the solution obtained while maintaining at 60 to 65° C., then hydrochloric acid was added thereto to adjust the pH at 0.5, followed by stirring for 30 minutes. Crystal obtained was filtered and washed with 200 parts of a 15% aqueous solution of sodium chloride to obtain the compound of the formula (1') (wherein R₁'=CH₃, X'=2,6-diethylanilino group and Y'=2-carboxyanilino group), as a red wet cake.

(3) The wet cake obtained in the above (2) was added in 800 parts of methanol, followed by heating to 60 to 65° C. and stirring. Thereafter, the wet cake was separated by filtration, washed with methanol and dried to obtain 30.4 parts of the compound of the following formula (2-12) (the compound of No. 2-10 in Table 2), as red crystal.

Similarly as in (A) to (C) of Example 1-3, ink was prepared and ink-jet print recording was carried out to evaluate the printed image.

Test results of the recorded image on hue, vividness, light fastness and ozone gas fastness are shown in Table 6. Evaluation Example 2-1 shows the results of the evaluation of the ink composition produced from the compound obtained in Example 2-1, Evaluation Example 2 shows the results of the evaluation of the ink composition produced from the compound obtained in Example 2-2, Evaluation Example 3 shows the results of the evaluation of the ink composition produced from the compound obtained in Example 2-3 and Evaluation Example 4 shows the results of the evaluation of the ink composition produced from the compound obtained in Example 2-4. Further, Table 6 also includes Comparative Example 1 which shows the evaluation result by use of the anthrapyridone compound described in Example 2-2 of patent literature 3.

TABLE 6

| | Hue | | | Vividness | Light-fastness (residual rate %) | Ozone-fastness (residual rate %) |
|---|---|---|---|---|---|---|
| | L* | a* | b* | C* | | |
| Evaluation Example 1 | | | | | | |
| Plain paper | 47.8 | 52.4 | −21.3 | 56.6 | 92.2 | — |
| PR | 54.6 | 68.1 | −34.6 | 78.4 | 91.8 | 89.9 |
| PM | 54.7 | 68.6 | −38.0 | 78.4 | 76.8 | 94.9 |
| Evaluation Example 2 | | | | | | |
| Plain paper | 48.2 | 52.4 | −21.6 | 56.7 | 91.0 | — |
| PR | 54.8 | 68.3 | −33.0 | 75.9 | 91.1 | 99.0 |
| PM | 54.2 | 67.1 | −37.4 | 76.8 | 90.0 | 94.0 |
| Evaluation Example 3 | | | | | | |
| Plain paper | 48.6 | 53.4 | −20.2 | 57.1 | 90.0 | — |
| PR | 55.6 | 67.2 | −33.9 | 75.3 | 90.6 | 88.5 |
| PM | 54.9 | 67.8 | −37.3 | 77.4 | 81.6 | 93.9 |

TABLE 6-continued

| | Hue | | | Vividness | Light-fastness (residual | Ozone-fastness (residual |
|---|---|---|---|---|---|---|
| | L* | a* | b* | C* | rate %) | rate %) |
| Evaluation Example 4 | | | | | | |
| Plain paper | 48.9 | 61.6 | −16.6 | 63.7 | 97.0 | — |
| PR | 59.3 | 72.4 | −32.1 | 78.6 | 93.0 | 90.4 |
| PM | 59.6 | 70.7 | −34.2 | 78.4 | 86.0 | 93.8 |
| Comparative Example 1 | | | | | | |
| Plain paper | 52.7 | 56.0 | — | 1.9 | 56.0 | 96.0 |
| PR | 60.1 | 67.1 | −14.9 | 68.7 | 85.0 | 51.0 |
| PM | 59.6 | 65.0 | −16.4 | 67.0 | 89.0 | 65.0 |

Table 3 shows that C* values in Evaluation Examples 1 to 4 are higher than that in Comparative Example 1, in particular, special Paper <Glossy> having an ink receiving layer provides further higher vividness. Also residual rates in ozone gas fastness in Evaluation Examples 1 to 4 are higher than that in Comparative Example 1, thus proving significantly improved image stability against ozone gas, and the like. Further, Evaluation Examples 1 to 4 show higher light fastness, thus proving that the anthrapyridone compound of the present invention is a superior compound as magenta dyestuff for ink-jet. In particular, in Evaluation Example 2 (evaluation of Ink Special Paper <Glossy> containing the compound of the formula (2-10), having an alkylthio group), ozone gas fastness and light fastness are shown to be significantly superior.

INDUSTRIAL APPLICABILITY

The anthrapyridone compound of the present invention is superior to the compound in Comparative Example in all items including hue (vividness), light fastness and ozone gas fastness and shows stable high quality in each medium (recording material). Further, dyestuffs obtained in Examples 2-1 to 4, having water-solubility of 100 g/l or more under an alkaline condition (pH 8 to 9) in the evaluation with filter paper-spot, each can be used easily as they have wide rage of applications such that a stable ink or a high concentration ink can be prepared as ink-jet dyestuff by using them.

The anthrapyridone compound of the present invention is generally superior to the compound in Comparative Example and shows stable high quality in each medium (recording material). Further, dyestuffs obtained in Examples 1-1 to 3, having water-solubility of 100 g/l or more under an alkaline condition (pH 8 to 9), each can be used easily as they have wide rage of applications such that a stable ink or a high concentration ink can be prepared as ink-jet dyestuff by using them.

The invention claimed is:

1. An anthrapyridone compound represented by the following formula (1):

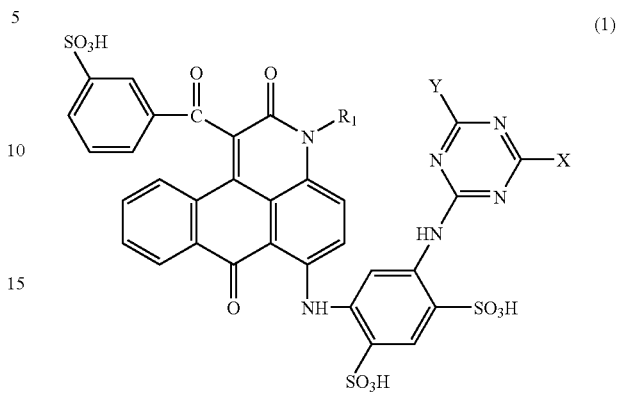

wherein $R_1$ represents a hydrogen atom, an alkyl group, a hydroxy lower alkyl group, a cyclohexyl group, mono- or dialkylaminoalkyl group or a cyano lower alkyl group;

X represents an anilino group which may be substituted with a sulfonic acid group, a methoxy group, an anilino group and a phenoxy group; methyl-sulfoanilino group, a methoxy-sulfoanilino group, a carboxy-sulfoanilino group, a carboxy-hydroxyanilino group, a naphthylamino group which may be substituted with a sulfonic acid group, mono- or dialkylamino group which may be substituted with a sulfonic acid group, a carboxyl group and a hydroxyl group, an aralkylamino group, a cycloalkylamino group, a phenoxy group which may be substituted with a sulfonic acid group, a carboxyl group, an acetylamino group, an amino group, a hydroxyl group, a phenoxy group, or a phenyl group, a monoalkylaminoalkylamino group, a dialkylaminoalkylamino group; a hydroxyl group or an amino group; and Y represents a chlorine atom, a hydroxyl group, an amino group, mono- or dialkylamino group which may have a substituent selected from the group consisting of a sulfonic acid group, a carboxyl group and a hydroxyl group on an alkyl group, or a morpholino group, or the salt thereof.

2. The anthrapyridone compound or the salt thereof according to claim 1, wherein $R_1$ in the above formula (1) is a methyl group.

3. The anthrapyridone compound or the salt thereof according to claim 1 or 2, wherein Y in the above formula (1) is a hydroxyl group or an amino group.

4. The anthrapyridone compound or the salt thereof according to any one of claims 1 to 3, wherein X in the above formula (1) is an anilino group, a 2-sulfoanilino group, a 2,5-disulfoanilino group, a 2-ethylhexylamino group or a cyclohexylamino group, a 4-methoxy-2-sulfoanilino group, a 2-carboxy-5-sulfoanilino group and a 3-carboxy-4-hydroxyanilino group.

5. An anthrapyridone compound represented by the following formula (1'):

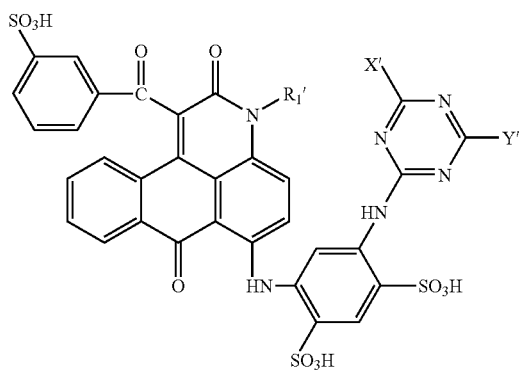

(1')

wherein R₁' represents a hydrogen atom, an alkyl group, a hydroxyalkyl group, a cyclohexyl group, mono- or dialkylaminoalkyl group or a cyano alkyl group;

X' represents an aniline group which may be substituted with a carboxyl group, a sulfonic acid group, an alkyl group, an alkoxyl group, an anilino group or a phenoxy group; a methyl-sulfoanilino group; a carboxy-sulfoanilino group; a naphthylamino group which may be substituted with a sulfonic acid group; an aralkylamino group; a cycloalkylamino group or a phenoxy group which may be substituted with a sulfonic acid group, a carboxyl group, an acetylamino group, an amino group, a hydroxyl group, a phenoxy group or a phenyl group; and Y' represents an alkylthio group which may have a substituent selected from the group consisting of a sulfonic acid group, a carboxyl group and a hydroxyl group on an alkyl group, a phenylthio group which may be substituted with a carboxyl group, a sulfonic acid group, a hydroxyl group, an alkyl group or an alkoxyl group or an anilino group which may be substituted with a carboxyl group, a sulfonic acid group, an alkyl group, an alkoxyl group, an anilino group or a phenoxy group, on a phenyl group, or the salt thereof.

6. The anthrapyridone compound or the salt thereof according to claim 5, wherein R₁' in the formula (1') is a methyl group.

7. The anthrapyridone compound or the salt thereof according to claim 5 or 6, wherein Y₁' in the formula (1') is an anilino group, a 2-carboxyanilino group or a 3-sulfopropylthio group.

8. The anthrapyridone compound or the salt thereof according to any one of claims 5 to 7, wherein X₁' in the formula (1') is an anilino group, a 2,6-dimethylanilino group, a 2,4,6-trimethylanilino group, a 2,6-diethylanilino group, a 2-carboxyanilino group, a 2-sulfoanilino group, a 2,5-disulfoanilino group, a benzylamino group or a cyclohexylamino group.

9. A water-based magenta ink composition characterized by comprising the anthrapyridone compound or the salt thereof according to any one of claims 1 to 8 as a dyestuff component.

10. The water-based magenta ink composition according to claim 9, wherein the composition contains a water-soluble organic solvent.

11. The water-based magenta ink composition according to claim 9, wherein the content of an inorganic salt in the anthrapyridone compound or the salt thereof is 1% by mass or less.

12. The water-based magenta ink composition according to claim 11, wherein the composition contains a water-soluble organic solvent.

13. The water-based magenta ink composition according to claim 9, which is used for ink-jet recording.

14. The water-based magenta ink composition according to claim 12, which is used for ink-jet recording.

15. A method for ink-jet recording, wherein ink droplets are ejected responding to the record signals to record onto a recording material, characterized by using the water-based magenta ink composition according to claim 9 as an ink.

16. A method for ink-jet recording, wherein ink droplets are ejected responding to the record signals to record onto a recording material, characterized by using the water-based magenta ink composition according to claim 12 as an ink.

17. The method for ink-jet recording according to claim 15, wherein the recording material is an information transmission sheet.

18. A container containing the water-based magenta ink composition according to claim 9.

19. An ink-jet printer having the container according to claim 18.

20. A colored article comprising the anthrapyridone compound or the salt thereof according to any one of claims 1 to 8.

* * * * *